US012309471B2

(12) United States Patent
Imamura

(10) Patent No.: US 12,309,471 B2
(45) Date of Patent: May 20, 2025

(54) CAMERA

(71) Applicant: FUJIFILM Corporation, Tokyo (JP)

(72) Inventor: Hibiki Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/884,667

(22) Filed: Sep. 13, 2024

(65) Prior Publication Data

US 2025/0097551 A1   Mar. 20, 2025

(30) Foreign Application Priority Data

Sep. 15, 2023 (JP) ................. 2023-150540

(51) Int. Cl.
*H04N 23/51* (2023.01)
*H04N 23/55* (2023.01)

(52) U.S. Cl.
CPC ............. *H04N 23/51* (2023.01); *H04N 23/55* (2023.01)

(58) Field of Classification Search
CPC ............................... H04N 23/51; H04N 23/55
See application file for complete search history.

(56) References Cited

U.S. PATENT DOCUMENTS

2020/0050416 A1\* 2/2020 Myung ............... G06F 3/04886

FOREIGN PATENT DOCUMENTS

| JP | H11-317896 A | 11/1999 |
|---|---|---|
| JP | 2002-344779 A | 11/2002 |
| JP | 2003-087629 A | 3/2003 |
| JP | 2003-330084 A | 11/2003 |
| JP | 2004-004309 A | 1/2004 |
| JP | 2005-024999 A | 1/2005 |
| JP | 2005-149235 A | 6/2005 |
| JP | 2006-108746 A | 4/2006 |
| JP | 2008-306381 A | 12/2008 |
| JP | 2009-159606 A | 7/2009 |

OTHER PUBLICATIONS

Office Action issued in JP 2023-150540; mailed by the Japanese Patent Office on Jul. 9, 2024.
Yuko, Yano, "Toy camera DSC Pieni: Check out how to use it, how it looks, and examples [Small but amazing]—Make work fun and broaden your horizons", Job Story, [online], Oct. 8, 2021, searched Jul. 4, 2024, Internet <URL: https://jobstory.jp/toy-camera-ii1/>.
International Search Report issued in PCT/JP2024/032439; mailed Nov. 12, 2024.

\* cited by examiner

*Primary Examiner* — Joel W Fosselman
(74) *Attorney, Agent, or Firm* — Studebaker Brackett PLLC

(57) ABSTRACT

A camera includes a housing, an opening portion that is provided in the housing, through which subject light is incident on an imaging lens, and that is disposed at a position at which the opening portion overlaps with a center of the housing in a width direction and a shutter button that is provided at a rear surface and that is disposed at a position at which the shutter button at least partially overlaps with a projection of the opening portion on the rear surface in a case where a side of the housing on which the opening portion is provided is referred to as a front surface and a side facing the front surface in an optical axis direction of the imaging lens is referred to as the rear surface.

19 Claims, 15 Drawing Sheets

CAMERA

CROSS REFERENCE TO RELATED APPLICATIONS

This application claims priority from Japanese Application No. 2023-150540, filed on Sep. 15, 2023, the entire disclosure of which is incorporated herein by reference.

BACKGROUND

1. Technical Field

The present disclosed technology relates to a camera.

2. Related Art

Described in JP2003-087629A is a digital camera including an imaging element that converts a subject image into an electric signal, an electronic view finder that displays an image formed on the imaging element based on the luminous flux of the subject image, and a release button used to start imaging. The release button is disposed on a surface approximately parallel to a screen of the electronic view finder and on a right side of the electronic view finder as seen from a camera rear surface side.

Described in JP2005-024999A is an imaging apparatus including an imaging apparatus body and a shutter operation unit that is provided at the imaging apparatus body, that is movable along an optical axis direction of an imaging lens, and of which movement results in a shutter being operated.

Described in JP2009-159606A is an imaging apparatus including a housing that constitutes an exterior and that has an elongated shape, an imaging element that is incorporated in the housing, an imaging optical system that is incorporated in the housing and that guides a subject image to the imaging element, and a shutter button for an imaging operation, the shutter button being provided at the housing. A gripping target portion of the housing that is gripped by a hand of a photographer who performs imaging by means of the imaging apparatus and the shutter button are positioned at positions offset from each other in a longitudinal direction of the housing, an objective lens of the imaging optical system that is positioned closest to a subject side is provided at the same surface as a surface of the housing at which the shutter button is provided, is provided in the vicinity of the shutter button, and is provided at a position that is on a side opposite to the gripping target portion of the housing with the shutter button interposed therebetween.

SUMMARY

Each of the cameras disclosed in the related art is a type of camera of which a camera housing is gripped by means of fingers and a palm. Therefore, the posture of the camera is stable since the camera housing can be held in a state of being gripped by fingers and being supported by a palm and thus the posture of the camera is not much influenced by an operation of pressing a shutter button with a finger.

Meanwhile, a case where the camera is reduced in size (for example, to such a size that the camera fits in an adult's palm) will be considered. In this case, it is difficult to support the camera housing with a palm, and the camera housing is held with fingers in a pinching manner. In addition, an operation of pressing the shutter button is performed by moving any of fingers pinching the camera housing. As a result, in a case where the camera is reduced in size, the posture of the camera may be made unstable in a case where the shutter button is pressed.

An embodiment according to the present disclosed technology provides a camera with which it is possible to realize stable operation even in the case of reduction in camera size.

According to a first aspect of the present disclosed technology, there is provided a camera including a housing, an opening portion that is provided in the housing, through which subject light is incident on an imaging lens, and that is disposed at a position at which the opening portion overlaps with a center of the housing in a width direction, and a shutter button that is provided at a rear surface and that is disposed at a position at which the shutter button at least partially overlaps with a projection of the opening portion on the rear surface in a case where a side of the housing on which the opening portion is provided is referred to as a front surface and a side facing the front surface in an optical axis direction of the imaging lens is referred to as the rear surface.

A second aspect of the present disclosed technology provides the camera according to the first aspect, in which the opening portion is disposed at a position at which the opening portion overlaps with a center of the housing in a height direction, the height direction being orthogonal to the width direction.

A third aspect of the present disclosed technology provides the camera according to the first aspect, in which a nearby region is provided on at least a portion of a vicinity of the opening portion on the front surface, and a dimension of the nearby region in the width direction of the housing is smaller than a total width of the opening portion or a dimension of the nearby region in a height direction of the housing that is orthogonal to the width direction is smaller than a total height of the opening portion.

A fourth aspect of the present disclosed technology provides the camera according to the third aspect, in which a dimension of the nearby region is smaller than the total width of the opening portion on both sides of the opening portion in the width direction or a dimension of the nearby region is smaller than the total height of the opening portion on both sides of the opening portion in the height direction.

A fifth aspect of the present disclosed technology provides the camera according to the fourth aspect, in which the dimension of the nearby region is smaller than the total width of the opening portion on both sides of the opening portion in the width direction, and the dimension of the nearby region is smaller than the total height of the opening portion on both sides of the opening portion in the height direction.

A sixth aspect of the present disclosed technology provides the camera according to the first aspect, in which a nearby region is provided on at least a portion of a vicinity of the opening portion on the front surface, and a portion of the nearby region overlaps with the shutter button in a direction orthogonal to an optical axis.

A seventh aspect of the present disclosed technology provides the camera according to the sixth aspect, in which the nearby region is provided on each of both sides of the opening portion in the width direction or a height direction of the housing.

An eighth aspect of the present disclosed technology provides the camera according to the first aspect, in which a nearby region, via which the housing is holdable with fingers, is provided on each of both sides of the opening portion in the width direction or a height direction of the housing.

A ninth aspect of the present disclosed technology provides the camera according to the first aspect, in which a peripheral edge of the opening portion protrudes on the front surface.

A tenth aspect of the present disclosed technology provides the camera according to the first aspect, in which, as seen in a side view of the housing, a protrusion amount of a peripheral edge of the opening portion is larger on a lower side than on an upper side in a height direction of the housing in a case where a surface of the housing that connects the front surface and the rear surface to each other is referred to as a side surface.

An eleventh aspect of the present disclosed technology provides the camera according to the first aspect, in which, as seen in a front view of the housing, a projection area of the opening portion is equal to or greater than 20% of a projection area of the housing.

A twelfth aspect of the present disclosed technology provides the camera according to the first aspect, in which, as seen in a front view of the housing, a ratio of a maximum height of the housing to a maximum width of the housing is 1.0 to 1.2.

A thirteenth aspect of the present disclosed technology provides the camera according to the first aspect, in which a finger hooking portion is formed at the shutter button.

A fourteenth aspect of the present disclosed technology provides the camera according to the thirteenth aspect, in which the finger hooking portion is a recess portion recessed toward a front surface side.

A fifteenth aspect of the present disclosed technology provides the camera according to the first aspect, in which the shutter button is pressable in a direction from a rear surface side to a front surface side.

A sixteenth aspect of the present disclosed technology provides the camera according to the first aspect, in which the housing fits in a sphere having a radius equal to or greater than 1 cm and equal to or smaller than 10 cm.

A seventeenth aspect of the present disclosed technology provides the camera according to the fifteenth aspect, in which the housing fits in a sphere having a radius equal to or greater than 1 cm and equal to or smaller than 3 cm.

An eighteenth aspect of the present disclosed technology provides the camera according to the first aspect, in which the housing is not provided with a display unit used to check a subject image.

A nineteenth aspect of the present disclosed technology provides the camera according to the first aspect, in which the front surface, the rear surface, and both side surfaces of the housing are composed of curved surfaces that protrude outward except for the opening portion and the shutter button, the side surfaces connecting the front surface and the rear surface to each other.

A twentieth aspect of the present disclosed technology provides the camera according to the first aspect, in which at least a portion of a region including a center of a lower surface of an outer peripheral surface of the housing is composed of a flat surface.

The present disclosed technology provides a camera with which it is possible to realize stable operation even in the case of reduction in camera size.

DESCRIPTION OF EMBODIMENTS

An example of a camera according to an embodiment of the present disclosed technology will be described with reference to the accompanying drawings.

In the following description, for convenience of description, a front-rear direction (may also be referred to as a depth direction), a width direction, and a height direction of a camera 10 are represented by three arrows X, Y, and Z. First, the height direction is represented by the arrow Y, a direction along the arrow Y which is denoted by the arrow Y will be referred to as an upward direction of the camera 10, and a direction opposite to the upward direction will be referred to as a downward direction. The width direction is represented by the arrow X orthogonal to the arrow Y, a direction denoted by the arrow X will be referred to as a rightward direction of the camera 10, and a direction opposite to the rightward direction will be referred to as a leftward direction. The front-rear direction is represented by the arrow Z orthogonal to the arrow X and the arrow Y, a direction denoted by the arrow Z will be referred to as a forward direction of the camera 10, and a direction opposite to the forward direction will be referred to as a rearward direction. That is, a direction extending toward a subject along an optical axis L (refer to FIG. 3) of the camera 10 is the forward direction. In addition, in the following description, expressions using sides such as an upper side, a lower side, a left side, a right side, a front side, and a rear side have the same meanings as the expressions using the directions.

Figure 1:
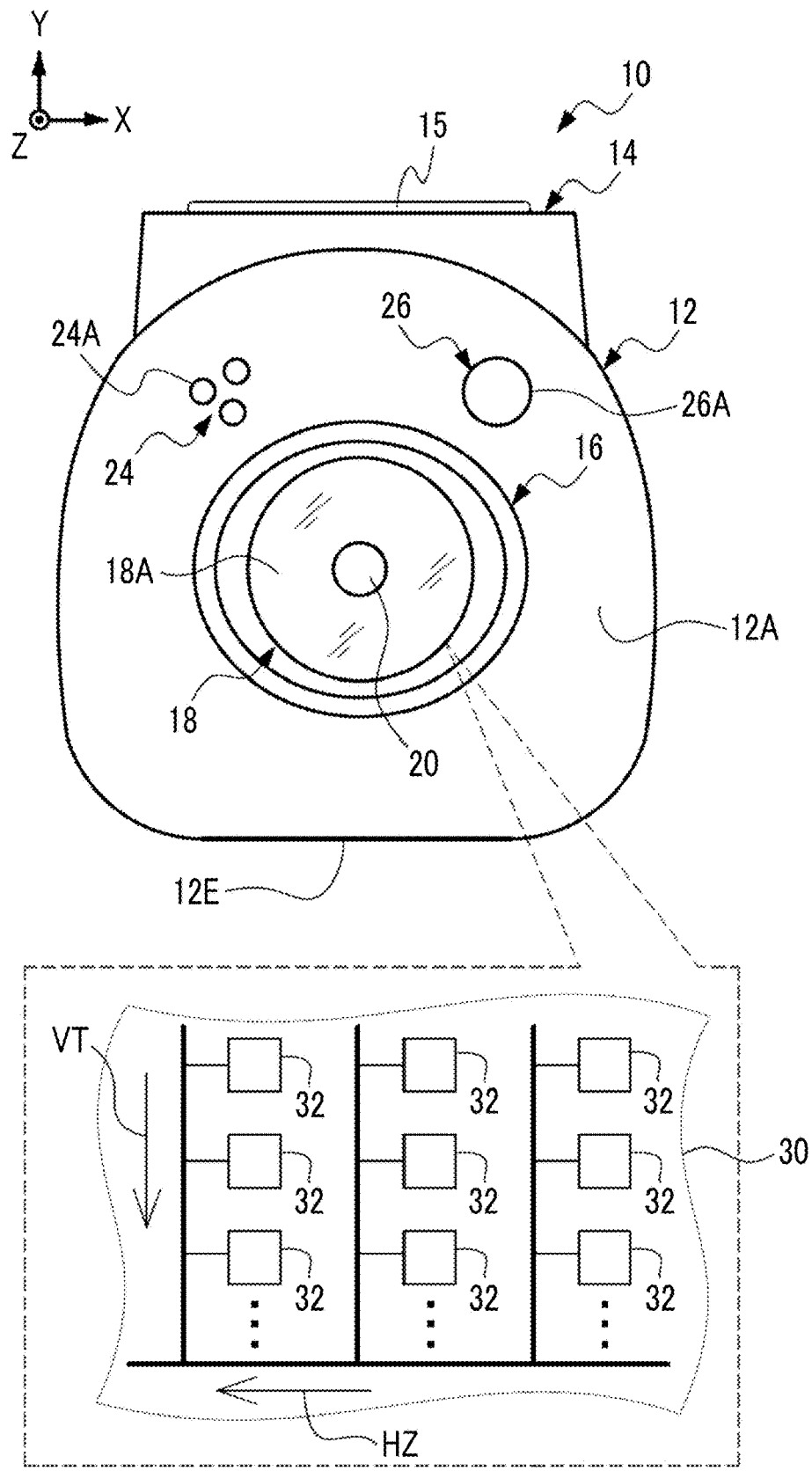
FIG. 1 is a front view showing an example of a configuration of a camera according to an embodiment.

The width direction and the height direction of the camera 10 will be more specifically described based on an imaging element 30. For example, as shown in FIG. 1, the imaging element 30 is provided inside a housing 12. The imaging element 30 is an image sensor such as a complementary metal oxide semiconductor (CMOS) image sensor and a charge coupled device (CCD) image sensor. The imaging element 30 includes an imaging surface on which a plurality of pixels 32 are two-dimensionally arranged. The pixels 32 are light-receiving elements such as photodiodes. On the imaging surface, a pixel selection line is routed along a horizontal direction HZ for each of the pixels 32, and a signal reading line for the reading out of a signal of a selected pixel 32 is routed along a vertical direction VT.

Here, a direction along the vertical direction VT of the imaging element 30 will be referred to as the height direction of the camera 10 (that is, the direction along the arrow Y in FIG. 1) and a direction along the horizontal direction HZ of the imaging element 30 will be referred to as the width direction (that is, a direction along the arrow X in FIG. 1) of the camera 10.

For example, as shown in FIG. 1, the camera 10 is an imaging apparatus that images a subject. In the case of the camera 10, for example, the subject is imaged in a case where a user presses a shutter button. The camera 10 can obtain a still image or a moving image including a subject image. The camera 10 has a small size (for example, the camera 10 has such a size that the camera 10 fits in an adult's palm) in comparison with a general digital or instant camera and can be easily handled by a user. The camera 10 is an example of a "camera" according to the embodiment of the present disclosed technology.

The camera 10 includes the housing 12. The housing 12 accommodates, in addition to the imaging element 30, electronic components and the like for realization of an imaging function of the camera 10. Although details will be described later, the housing 12 is designed to have a rounded shape as a whole. That is, an outer peripheral surface of the housing 12 is mainly composed of a curved surface and the outer shape of the housing 12 is an approximately egg-like shape. The housing 12 is provided with an opening portion 16. The opening portion 16 causes subject light to be incident on an imaging lens 20. In an example shown in FIG. 1, a lens unit 18 is exposed to the outside through the opening portion 16. The lens unit 18 is configured to include the imaging lens 20 and a holding frame 18A that holds the imaging lens 20. Here, the expression "the lens unit 18 is exposed" also means a state where the lens unit 18 is directly exposed and a state where the lens unit 18 is covered with a cover member to such a degree that there is no influence on the imaging of a subject. The housing 12 is an example of a "housing" according to the embodiment of the present disclosed technology, the imaging lens 20 is an example of an "imaging lens" according to the embodiment of the present disclosed technology, and the opening portion 16 is an example of an "opening portion" according to the embodiment of the present disclosed technology.

In addition, in a case where a side of the housing 12 at which the opening portion 16 is provided is referred to as a front surface 12A of the housing 12, the front surface 12A is provided with a speaker unit 24 and a flash unit 26. Regarding the speaker unit 24, various operation sounds (for example, an electronic sound resembling the sound of a shutter being released) are output from a sound source (not shown) provided inside the housing 12. In the example shown in FIG. 1, sound is output through three through-holes 24A. In addition, regarding the flash unit 26, light is emitted to a subject from a light source (not shown) provided inside the housing 12. In the example shown in FIG. 1, the light source is covered with a cover member 26A provided in the housing 12.

An upper portion of the housing 12 is provided with an indicator 14. The exterior of the indicator 14 is formed of a translucent material, and light from a light source provided in the indicator 14 is emitted to the outside. The indicator 14 can emit light in accordance with the state of operation of the camera 10. For example, in a case where the camera 10 communicates with the outside, the indicator 14 emits light having a preset color at preset light emission intervals. In the example shown in FIG. 1, the indicator 14 is a portion that protrudes upward from the housing 12. The indicator 14 has a trapezoidal shape as seen in a front view of the housing 12.

In addition, an upper surface 14A of the indicator 14 is provided with a power button 15. The power button 15 is provided on the upper surface 14A of the indicator 14 along a right-left direction (an X direction shown in FIG. 1). The camera 10 can be turned on by pressing the power button 15 several times (for example, three times). In addition, the camera 10 can be turned off by pressing the power button 15 for a few seconds (for example, 3 seconds).

In addition, a lower surface 12E is formed at a lower portion of the housing 12. At least a portion of a region including the center of the lower surface 12E is composed of a flat surface. Accordingly, the camera 10 can be placed on a desk or the like. Here, the expression "flat surface" also means a completely flat surface and a surface that is flat to such a degree that the housing 12 can be placed thereon. The lower surface 12E is an example of a "lower surface" according to the embodiment of the present disclosed technology.

Figure 2:
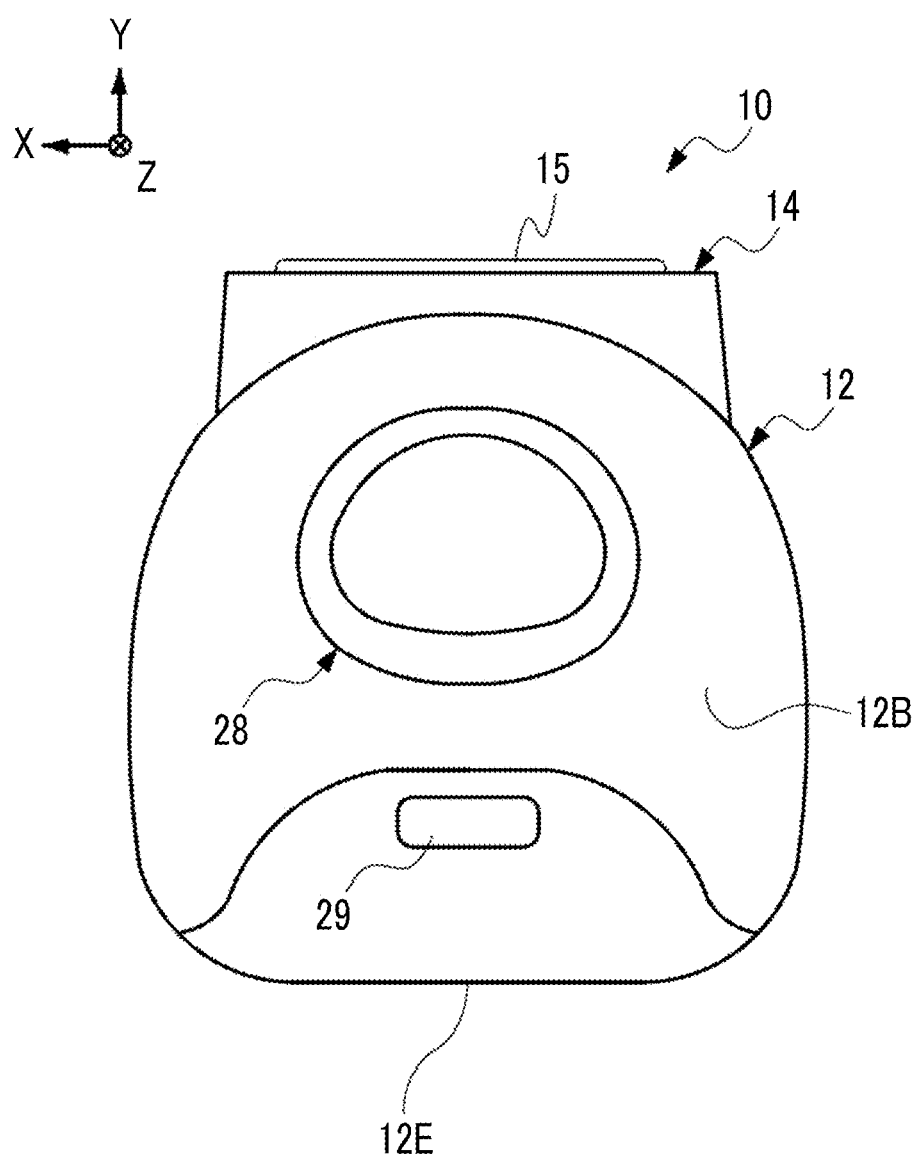
FIG. 2 is a rear view showing an example of the configuration of the camera according to the embodiment.

For example, as shown in FIG. 2, in a case where a side of the housing 12 that is opposite to the front surface 12A is referred to as a rear surface 12B (that is, in a case where a side facing the front surface 12A in the optical axis direction of the imaging lens 20 is referred to as the rear surface 12B), the rear surface 12B is provided with a shutter button 28. The shutter button 28 can be pressed in a direction toward the front surface 12A side. As described above, a subject is imaged by the camera 10 in a case where the shutter button 28 is pressed by a user. The shutter button 28 is an example of a "shutter button" according to the embodiment of the present disclosed technology.

In addition, in the case of a general digital camera, a display unit (for example, a liquid crystal display or the like) used to check a subject image is installed at a rear surface (that is, a surface opposite to a subject side) in many cases. Meanwhile, in the present embodiment, the rear surface 12B of the camera 10 is not provided with a display unit used to check a subject image. Note that the display unit used to check the subject image is not provided but it is a matter of course that the rear surface 12B may be provided with a display unit for other purposes (for example, a display unit indicating the residual charge of a battery).

In addition, the rear surface 12B of the housing 12 is provided with a reception portion 29. The reception portion 29 is a terminal that is electrically connected to an external device, and the reception portion 29 is, for example, a universal serial bus (USB) terminal. Through the reception portion 29, a battery of the camera 10 is charged or wired communication between the camera 10 and an external device is performed.

Figure 3:
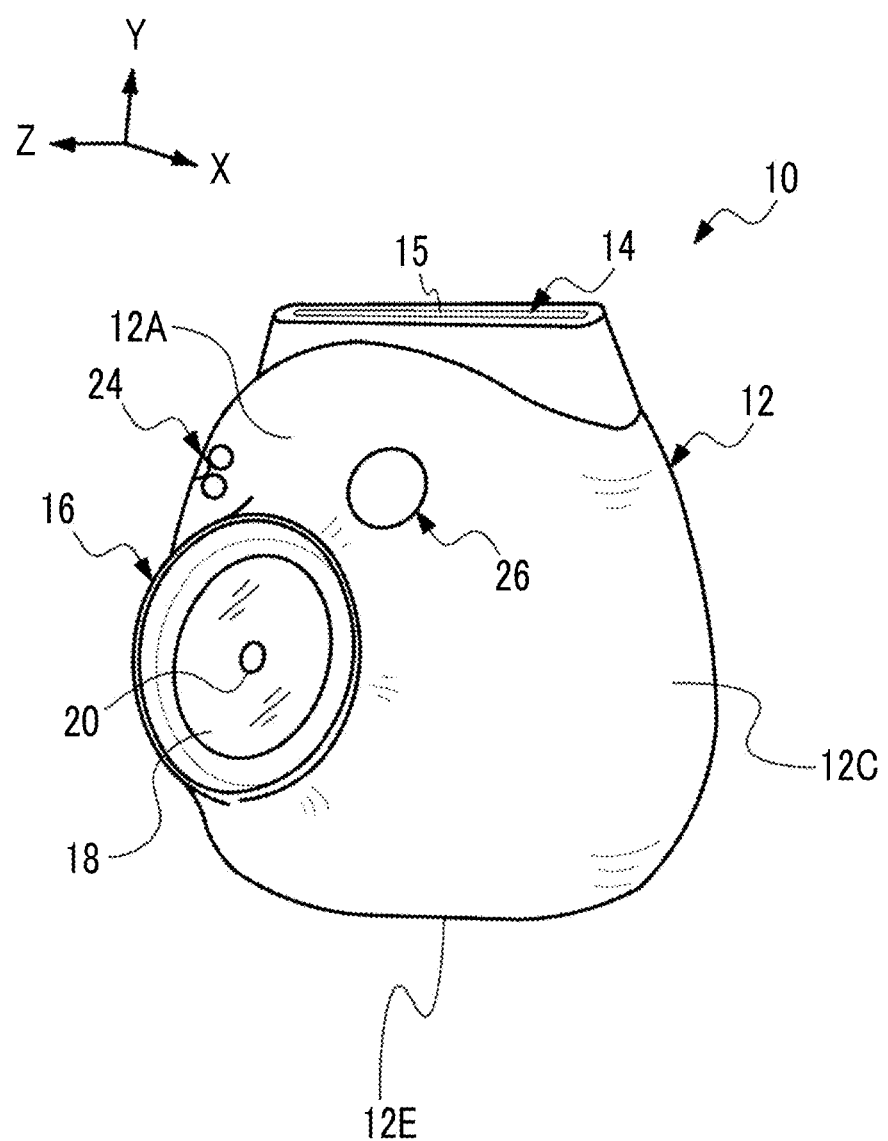
FIG. 3 is an external perspective view showing an example of the configuration of the camera according to the embodiment.

For example, as shown in FIG. 3, the outer shape of the housing 12 has a sphere-like shape as a whole. In addition, the indicator 14 protrudes in a trapezoidal shape from an upper portion of the housing 12. A right surface 12C that connects the front surface 12A and the rear surface 12B to each other is formed on a right side of the housing 12. The right surface 12C is formed in a curved surface shape.

In addition, the front surface 12A of the housing 12 has a curved surface shape. Furthermore, at the front surface 12A having the curved surface shape, a peripheral edge of the opening portion 16 protrudes from the front surface 12A. In other words, the opening portion 16 sticks out from the front surface 12A of the housing 12. In an example shown in FIG. 3, the opening portion 16 is a circular opening, and an inclined surface is formed over an area from the opening portion 16 to the front surface 12A along the peripheral edge of the opening portion 16.

Figure 4:
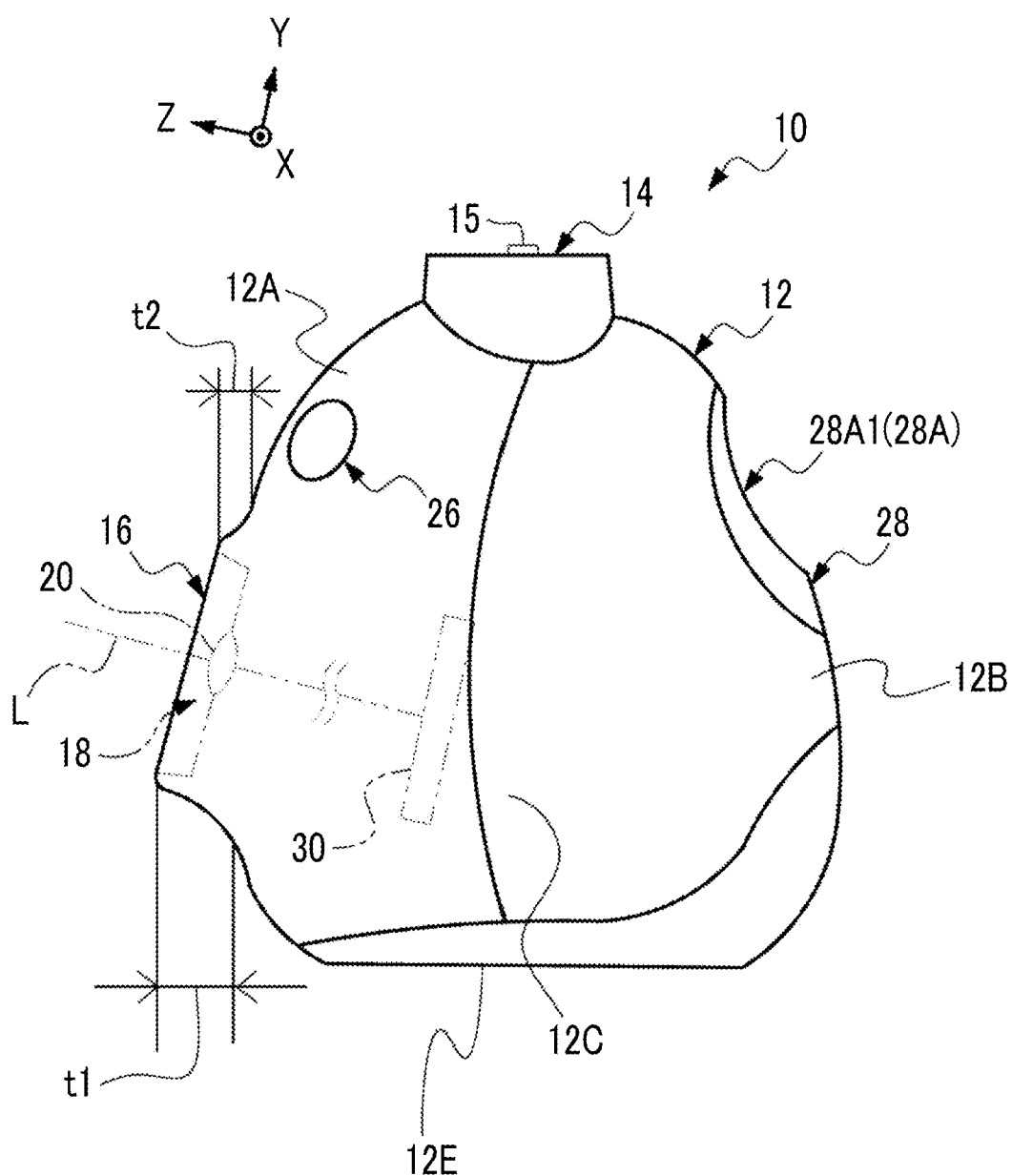
FIG. 4 is a side view showing an example of the configuration of the camera according to the embodiment.

For example, as shown in FIG. 4, as seen in a side view of the housing 12 (here, in a view of the housing 12 as seen from a right side), the amount of protrusion of the peripheral edge of the opening portion 16 from the front surface 12A on a lower side of the opening portion 16 is larger than the amount of protrusion of the peripheral edge of the opening portion 16 from the front surface 12A on an upper side of the opening portion 16. Specifically, a protrusion amount t1 of a lower peripheral edge of the opening portion 16 is larger than a protrusion amount t2 of an upper peripheral edge of the opening portion 16. That is, t1>t2. Accordingly, the opening portion 16 faces an upper side as seen in a side view of the housing 12. In addition, the lens unit 18 including the imaging lens 20 is exposed to the outside through the opening portion 16 and the imaging lens 20 is also set to face the upper side. That is, in a case where the housing 12 is placed on a horizontal surface, the optical axis L is inclined with respect to the horizontal direction such that the optical axis L is made higher on a subject side. Accordingly, in a case where imaging is performed in a state where the camera 10 is placed, the imaging can be performed in a state where an elevation angle is applied.

In addition, a finger hooking portion 28A is formed at the shutter button 28 provided on the rear surface 12B. Since the finger hooking portion 28A is provided, a finger of the user is likely to be hooked on the shutter button 28 and it is easy to grasp the position of the shutter button 28 or to press the shutter button 28. In an example shown in FIG. 4, at the shutter button 28, a recess portion 28A1 recessed toward the front surface 12A of the housing 12 is formed as the finger hooking portion 28A. In this case, a portion of a finger of a user fits in the recess portion 28A1, so that the finger of the user is hooked on the shutter button 28. The finger hooking portion 28A is an example of a "finger hooking portion" according to the embodiment of the present disclosed technology, and the recess portion 28A1 is an example of a "recess portion" according to the embodiment of the present disclosed technology.

Note that the recess portion 28A1 is merely an example, and it is a matter of course that any configuration in which a finger of the user is hooked on the shutter button 28 via the finger hooking portion 28A may also be adopted. For example, the finger hooking portion 28A may be a rib or a protrusion provided on the shutter button 28, or the finger hooking portion 28A may be realized by forming a surface of the shutter button 28 using a material having a larger friction coefficient than the housing 12.

Figure 5:
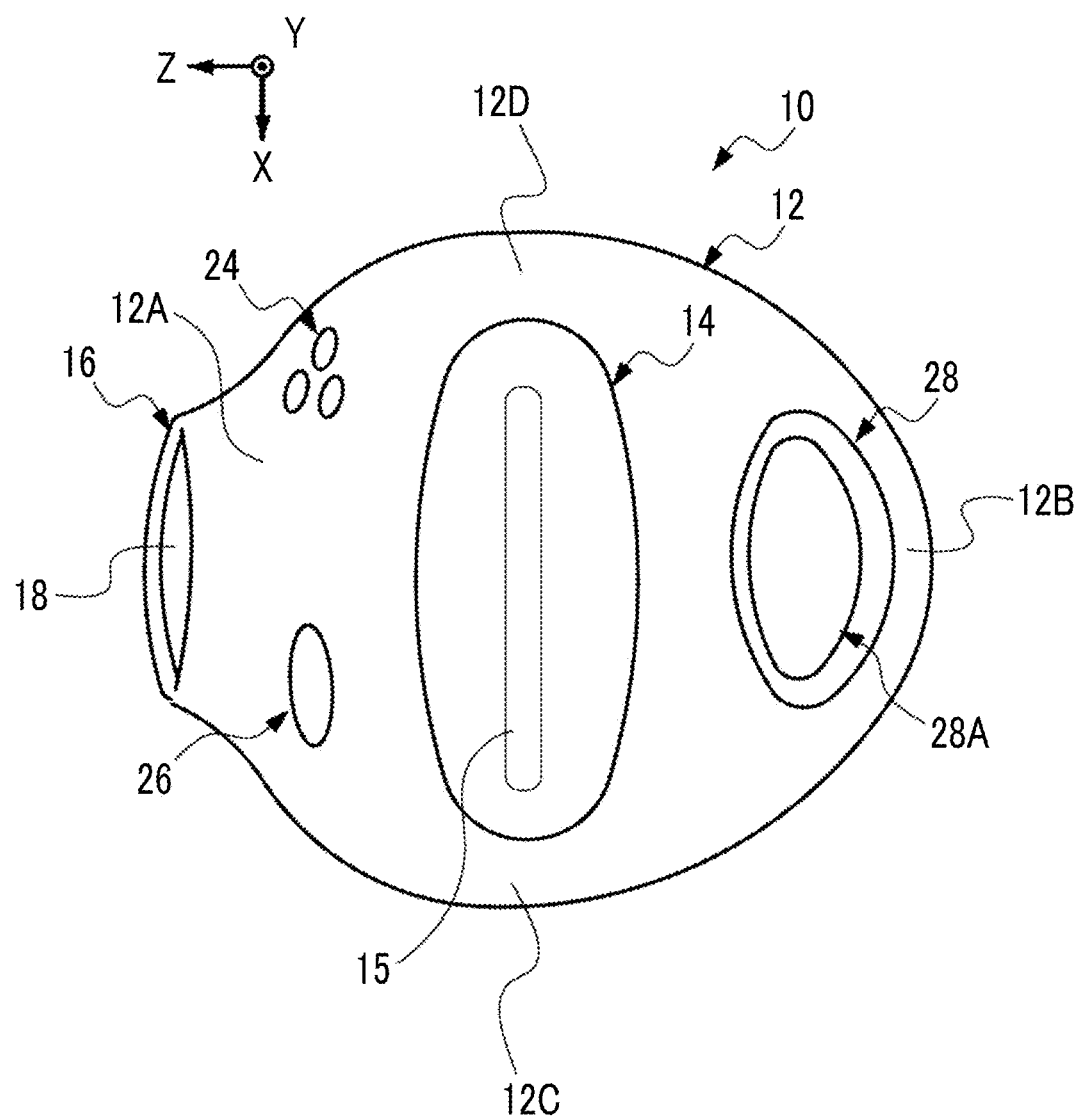
FIG. 5 is a top view showing an example of the configuration of the camera according to the embodiment.

For example, as shown in FIG. 5, in a top view of the housing 12, the housing 12 has a rounded shape. Specifically, each of the front surface 12A (excluding the opening portion 16 and the peripheral edge thereof) and the rear surface 12B (excluding the finger hooking portion 28A of the shutter button 28) has a curved surface shape protruding outward. In addition, the right surface 12C that connects the front surface 12A and the rear surface 12B to each other on the right side of the housing 12 also has a curved surface shape protruding outward. Furthermore, in addition, a left surface 12D that connects the front surface 12A and the rear surface 12B to each other on the left side of the housing 12 also has a curved surface shape protruding outward.

Figure 6:
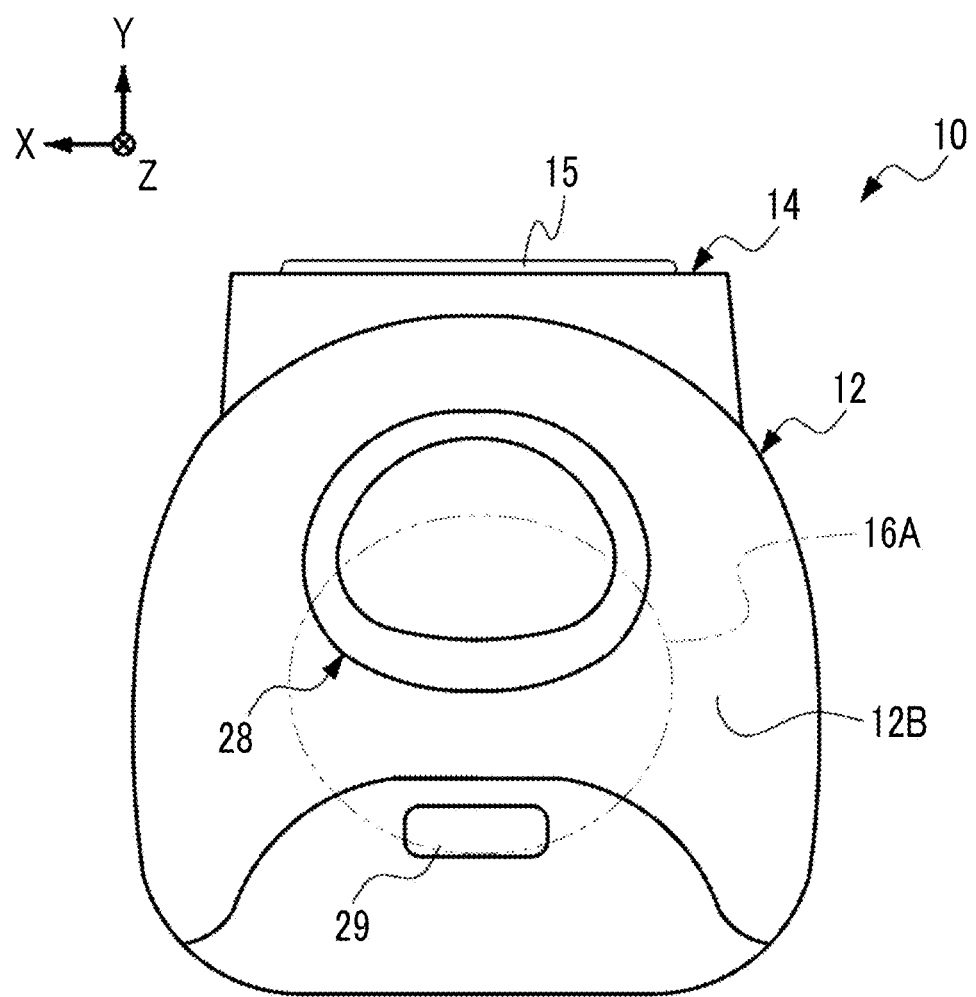
FIG. 6 is a conceptual view showing an example of a positional relationship between a shutter button and an opening portion according to the embodiment.

Next, a positional relationship between the opening portion 16 and the shutter button 28 of the housing 12 will be described. For example, as shown in FIG. 6, on the rear surface 12B of the housing 12, the shutter button 28 is disposed at a position at which the shutter button 28 at least partially overlaps with a projection of the opening portion 16 onto the rear surface 12B. In an example shown in FIG. 6, a projection region 16A obtained by virtually projecting the opening portion 16 onto the rear surface 12B and the shutter button 28 partially overlap with each other. Here, the expression "to virtually project the opening portion 16" means to project a region defined by an outer edge of the opening portion 16 onto the rear surface 12B from the front surface 12A of the housing 12 along the front-rear direction of the housing 12. Specifically, an upper portion of the projection region 16A overlaps with a lower portion of the shutter button 28. In other words, the opening portion 16 and the shutter button 28 are disposed together at positions relatively close to each other in the height direction in the housing 12.

Note that although the description has been made herein by using an example in which the projection region 16A and the shutter button 28 partially overlap with each other, this is merely an example. For example, the projection region 16A and the shutter button 28 may entirely overlap with each other, the entire shutter button 28 may overlap with a portion of the projection region 16A, or the entire projection region 16A may overlap with a portion of the shutter button 28. In addition, the way in which the projection region 16A and the shutter button 28 overlap with each other is not particularly limited as well. For example, a lower portion of the projection region 16A and an upper portion of the shutter button 28 may overlap with each other.

Figure 7:
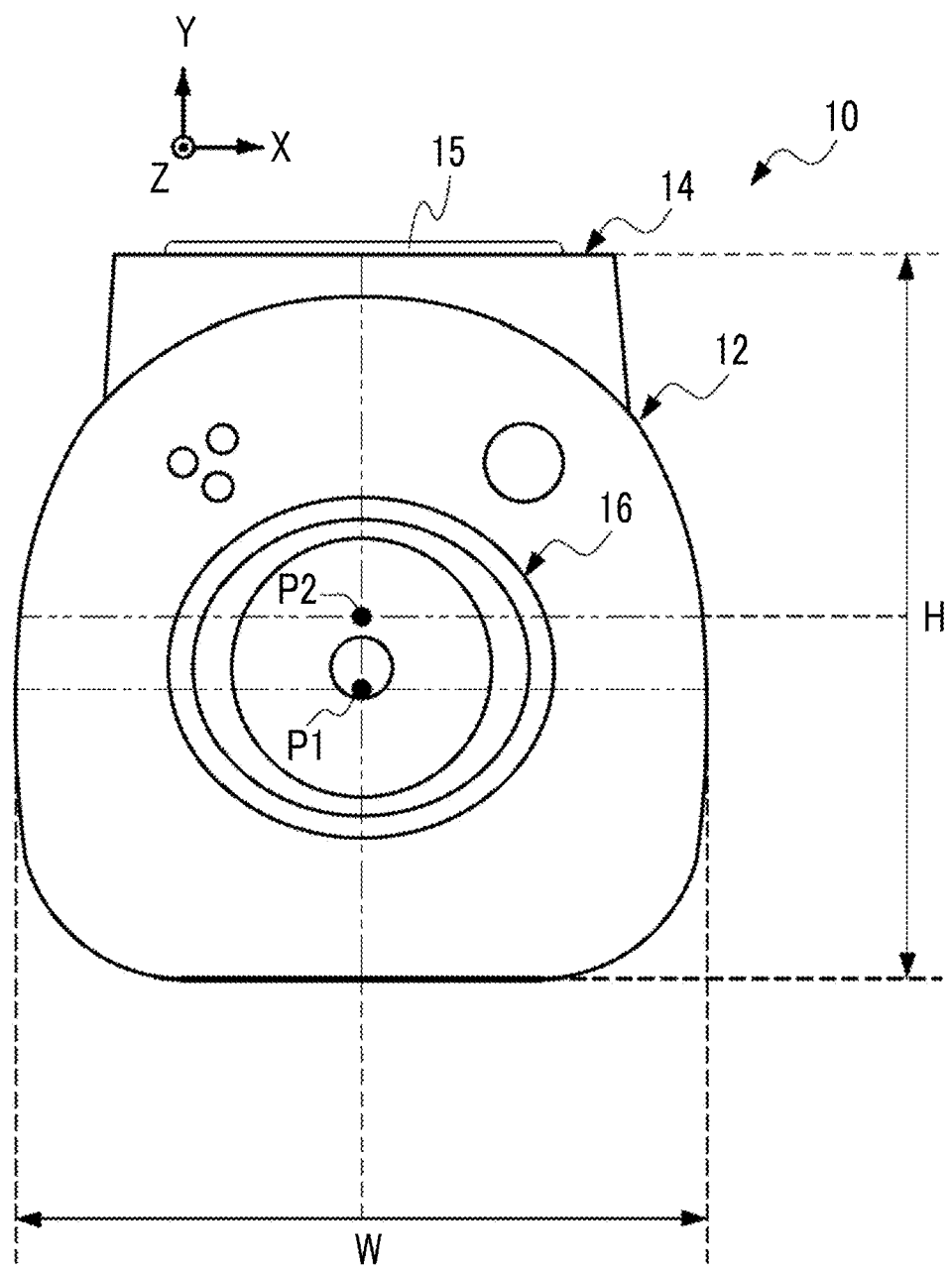
FIG. 7 is a front view showing an example of the way in which the opening portion according to the embodiment is disposed.

Next, disposition of the opening portion 16 at the front surface 12A of the housing 12 will be described. For example, as shown in FIG. 7, the opening portion 16 is disposed at a position at which the opening portion 16 overlaps with a center P1 of the front surface 12A of the housing 12 in the width direction. In other words, as seen in a front view of the housing 12, the center P1 is within the opening portion 16, virtually. Here, the center P1 in the width direction is a midpoint of a maximum width W of the front surface 12A of the housing 12. The center P1 is an example of a "center of a housing in a width direction" according to the embodiment of the present disclosed technology.

In addition, furthermore, the opening portion 16 is disposed at a position at which the opening portion 16 overlaps with a center P2 of the front surface 12A of the housing 12 in the width direction and the height direction. In other words, as seen in the front view of the housing 12, the center P2 is within the opening portion 16, virtually. Here, the center P2 in the width direction and the height direction is an intersection between a bisector of the maximum width W of the front surface 12A of the housing 12 and a bisector of a maximum height H of the front surface 12A of the housing 12. The center P2 is an example of a "center of a housing in a height direction" according to the embodiment of the present disclosed technology.

As described above, since the opening portion 16 is disposed at a position at which the opening portion 16 overlaps with the center P1, the opening portion 16 is disposed near the center in the width direction. Furthermore, since the opening portion 16 is disposed at a position at which the opening portion 16 overlaps with the center P2, the opening portion 16 is disposed near the center in the width direction and the height direction.

Figure 8:
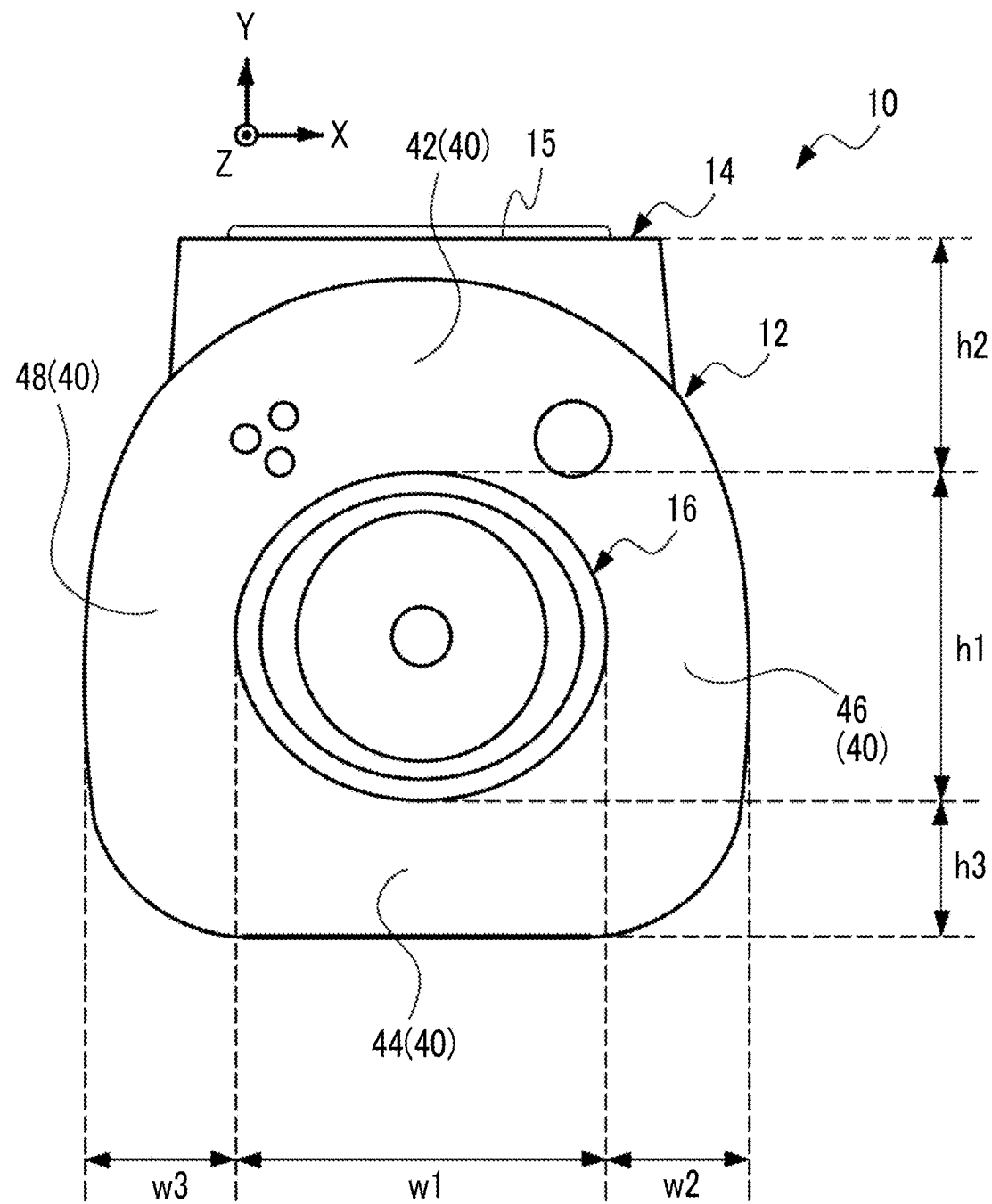
FIG. 8 is a front view showing an example of a relationship between the size of the opening portion and the sizes of nearby regions according to the embodiment.

For example, as shown in FIG. 8, at the front surface 12A of the housing 12, nearby regions 40 are provided around the opening portion 16. The nearby regions 40 are regions each extending from an outer edge of the opening portion 16 to an outer edge of the housing 12. The nearby regions 40 are examples of a "nearby region" according to the embodiment of the present disclosed technology. The nearby regions 40 include an upper nearby region 42 and a lower nearby region 44. Specifically, as seen in the front view of the housing 12, the upper nearby region 42 is provided above the opening portion 16 in the height direction. In addition, as seen in the front view of the housing 12, the lower nearby region 44 is provided below the opening portion 16 in the height direction. A dimension h2 of the upper nearby region 42 is smaller than a total height h1 of the opening portion 16 in the height direction, and a dimension h3 of the lower nearby region 44 is smaller than the total height h1 of the opening portion 16 in the height direction. Here, the total height h1 of the opening portion 16 is the maximum value of a distance across the opening portion 16 in the height direction. As described above, dimensions of the nearby regions 40 are smaller than the total height h1 of the opening portion 16 on both sides of the opening portion 16 in the height direction.

Note that although the description has been made by using an example in which the dimensions of the nearby regions 40 on both sides of the opening portion 16 in the height direction are smaller than the total height h1 of the opening portion 16, this is merely an example. For example, only the dimension h2 of the upper nearby region 42 may be smaller than the total height h1 of the opening portion 16, or only the dimension h3 of the lower nearby region 44 may be smaller than the total height h1 of the opening portion 16.

In addition, the nearby regions 40 include a right nearby region 46 and a left nearby region 48. Specifically, as seen in the front view of the housing 12, the right nearby region 46 is provided closer to a right side in the width direction than the opening portion 16 is. In addition, as seen in the front view of the housing 12, the left nearby region 48 is provided closer to a left side in the width direction than the opening portion 16 is. A dimension w2 of the right nearby region 46 is smaller than a total width w1 of the opening portion 16 in the width direction, and a dimension w3 of the left nearby region 48 is smaller than the total width w1 of the opening portion 16 in the width direction. Here, the total width w1 of the opening portion 16 is the maximum value of a distance across the opening portion 16 in the width direction. As described above, dimensions of the nearby regions 40 are smaller than the total width w1 of the opening portion 16 on both sides of the opening portion 16 in the width direction.

Note that although the description has been made by using an example in which the dimensions of the nearby regions 40 on both sides of the opening portion 16 in the width direction are smaller than the total width w1 of the opening portion 16, this is merely an example. For example, only the dimension w2 of the right nearby region 46 may be smaller than the total width w1 of the opening portion 16, or only the dimension w3 of the left nearby region 48 may be smaller than the total width w1 of the opening portion 16.

Furthermore, although the description has been made by using an example in which the dimensions of the nearby regions 40 in the height direction are smaller than the total height h1 of the opening portion 16 and the dimensions of the nearby regions 40 in the width direction are smaller than the total width w1 of the opening portion 16, this is merely an example. For example, only the dimensions of the nearby regions 40 in the height direction may be smaller than the total height h1 of the opening portion 16, or only the dimensions of the nearby regions 40 in the width direction may be smaller than the total width w1 of the opening portion 16.

Figure 9:
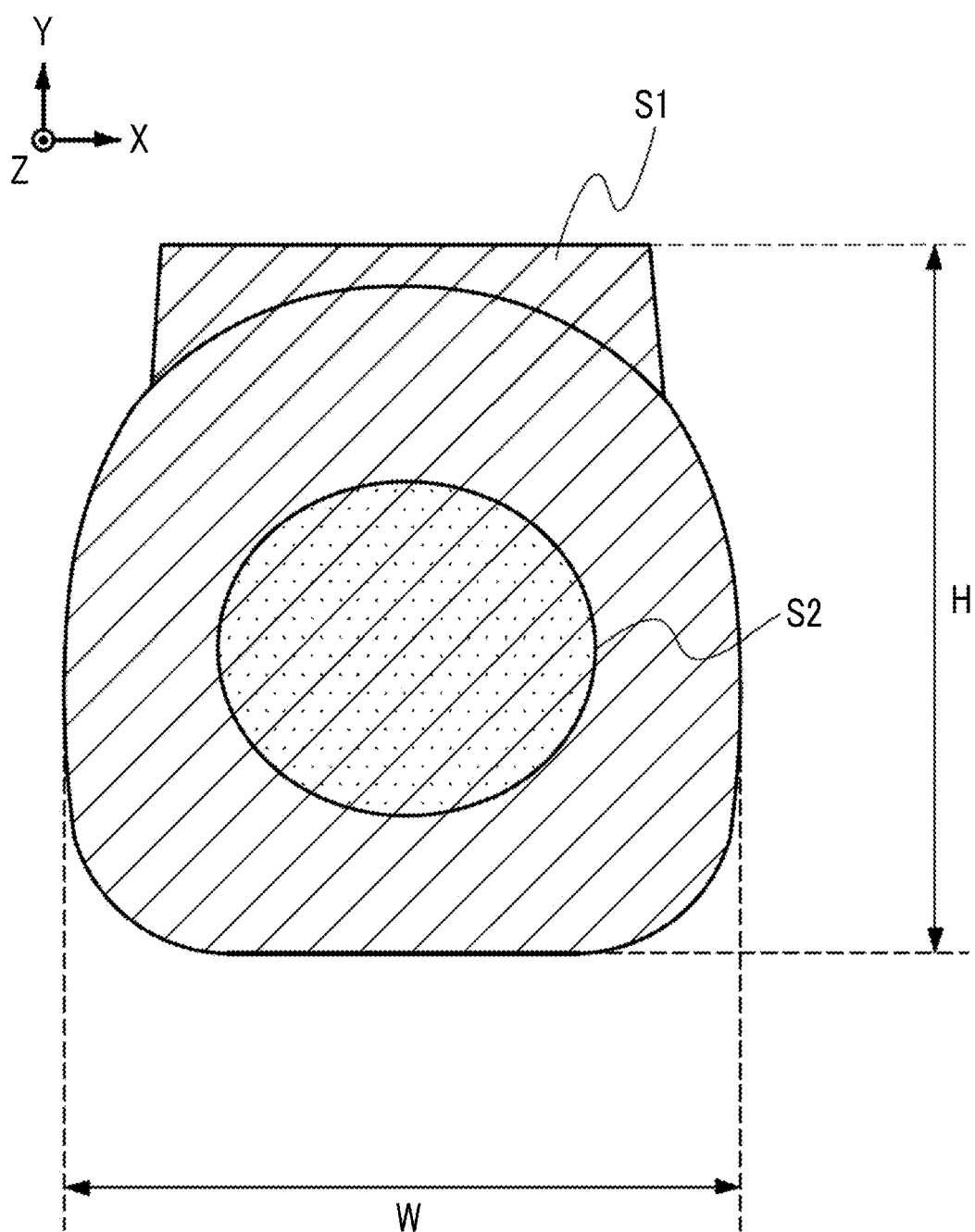
FIG. 9 is a conceptual view showing a relationship between the projection area of a housing and the projection area of the opening portion according to the embodiment.

For example, as shown in FIG. 9, as seen in the front view of the housing 12, a projection area S2 (the area of a region hatched with diagonal lines in FIG. 9) of the opening portion 16 is equal to or greater than 20% of a projection area S1 (the area of a region hatched with points in FIG. 9) of the housing 12. That is, $S2/S1 \times 100 \geq 20(\%)$. Here, the projection area of the opening portion 16 is the area inside an outer edge of the opening portion 16 in a case where the opening portion 16 is projected onto a virtual plane of which a normal direction is a direction along a Z direction. In addition, the projection area of the housing 12 is the area inside an outer edge of the housing 12 in a case where the housing 12 is projected onto the virtual plane of which the normal direction is the direction along the Z direction. As described above, the proportion of the size of the opening portion 16 to the size of housing 12 is large in comparison with the case of a general digital camera.

As seen in the front view of the housing 12, a ratio of the maximum height H to the maximum width W of the housing 12 is 1.0 to 1.2. That is, the housing 12 satisfies a relationship equation of H/W=1.0 to 1.2. As described above, the aspect ratio of the housing 12 in the front view is set to be close to 1 with the housing 12 being not laterally long in comparison with the case of a general digital camera.

Figure 10:
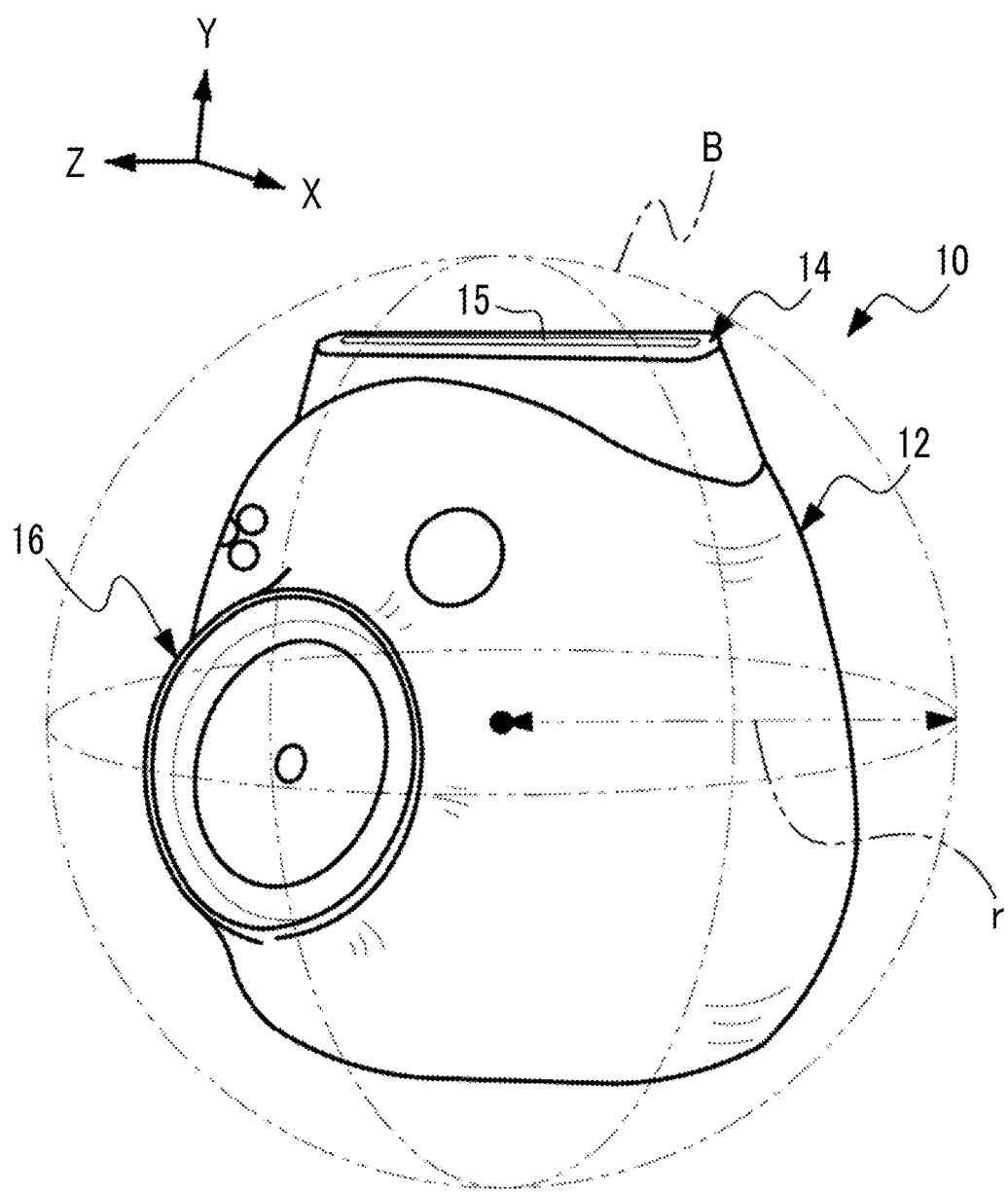
FIG. 10 is an external perspective view showing an example of an aspect in which the camera according to the embodiment fits in a sphere.

For example, as shown in FIG. 10, the housing 12 of the camera 10 has such a size that the housing 12 fits in a virtual sphere B having a radius r. Here, the radius r is equal to or greater than 1 cm and equal to or smaller than 10 cm, and furthermore, the radius r equal to or greater than 1 cm and equal to or smaller than 3 cm. In addition, the expression "to fit in the sphere B" means that the housing 12 can be disposed inside the sphere B without the housing 12 coming into contact with a spherical surface formed by the sphere B.

In addition, the volume of the housing 12 of the camera 10 is equal to or smaller than 4,190 $cm^3$. In addition, the volume of the housing 12 is equal to or smaller than 113 $cm^3$, and furthermore, the volume of the housing 12 is equal to or smaller than 4.19 $cm^3$.

Next, an example of the way in which the camera 10 according to the present embodiment is used will be described.

Figure 11:
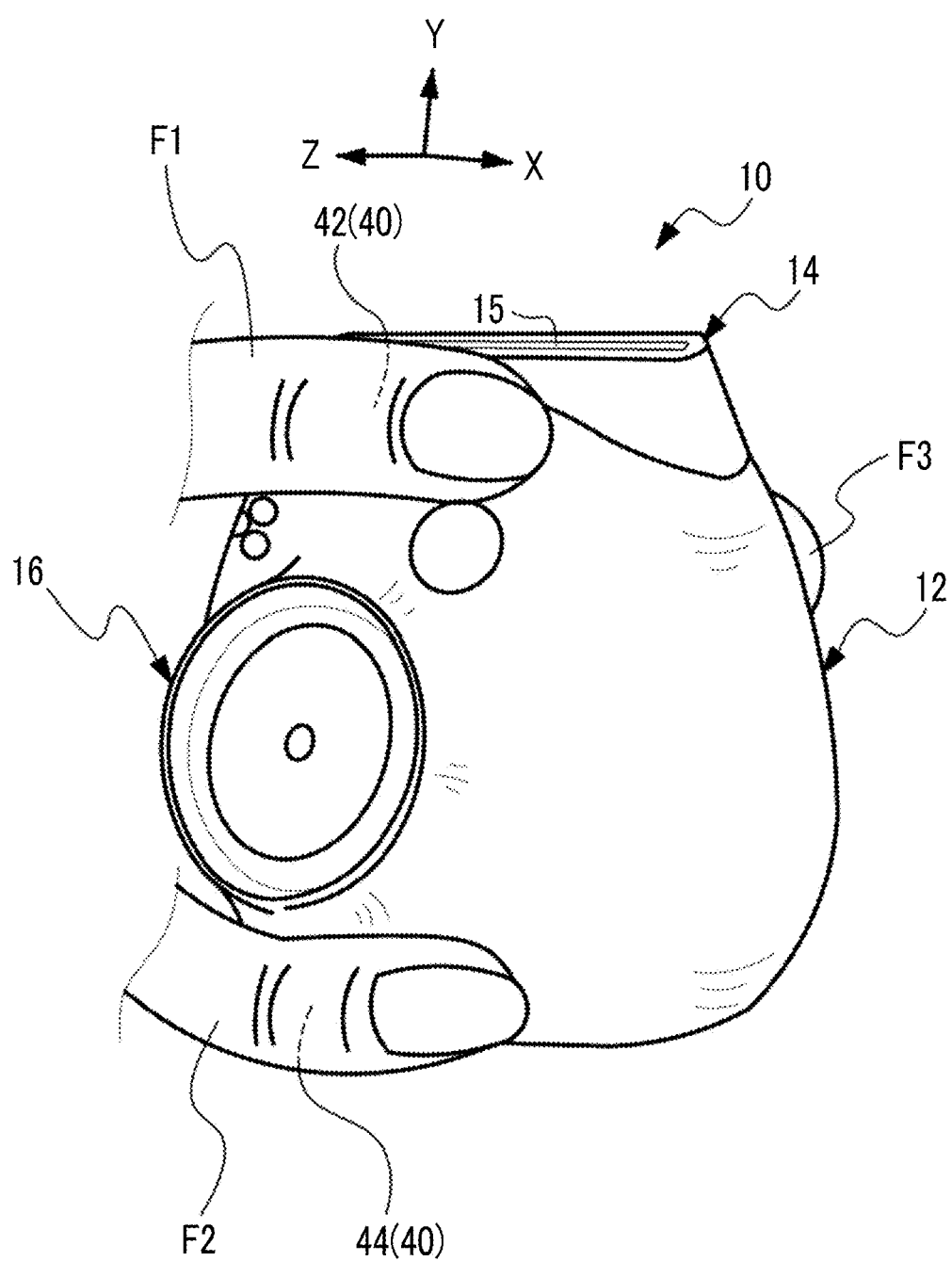
FIG. 11 is an external perspective view showing an example of the way in which the camera according to the embodiment is used.
Figure 12:
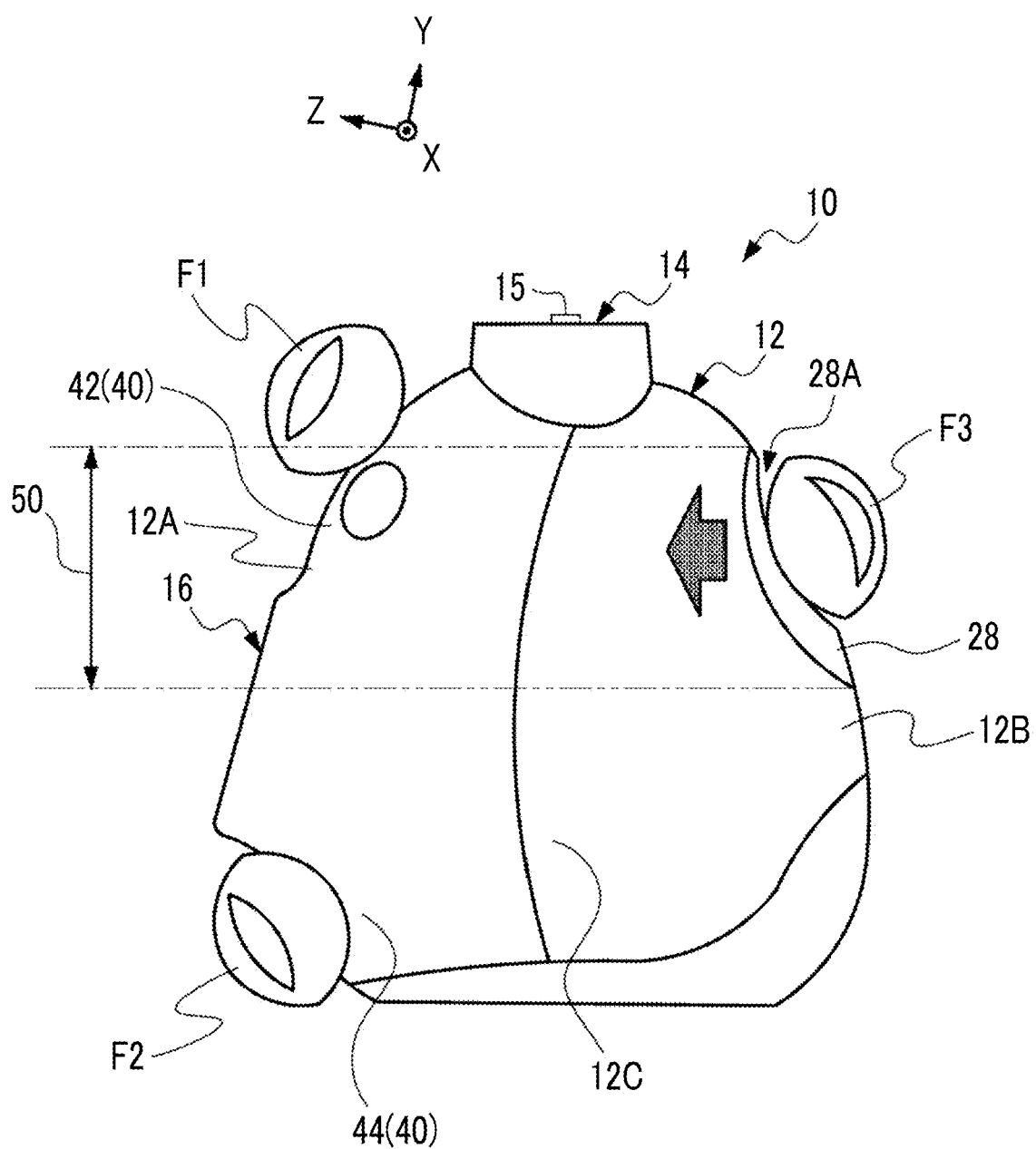
FIG. 12 is a side view showing an example of the way in which the camera according to the embodiment is used.

For example, as shown in FIGS. 11 and 12, a user grips the camera 10 by pinching the housing 12 with fingers from ahead and behind. Specifically, an index finger F1 and a middle finger F2 are caused to abut the rear surface 12B from the front surface 12A side of the housing 12, and a thumb F3 is caused to abut the front surface 12A from the rear surface 12B side. In an example shown in FIGS. 11 and 12, the index finger F1 is caused to abut the upper nearby region 42, and the middle finger F2 is caused to abut the lower nearby region 44. At the front surface 12A of the housing 12, the index finger F1 and the middle finger F2 sandwich the opening portion 16. Particularly, the middle finger F2 is caused to abut the lower nearby region 44 such that the middle finger F2 supports the opening portion 16 from below. Meanwhile, at the rear surface 12B, the user causes the thumb F3 to abut the shutter button 28. As described above, the nearby regions 40 function as regions via which the housing 12 can be held.

As described above, the shutter button 28 can be pressed in a direction toward the front surface 12A side. In a case where imaging is to be performed by means of the camera 10, a user presses the shutter button 28 in the direction toward the front surface 12A side (refer to an arrow in FIG. 12). Here, as seen in a side view of the housing 12, the shutter button 28 is disposed at a position at which the shutter button 28 overlaps with the upper nearby region 42 in the height direction. That is, as seen in the side view of the housing 12, a corresponding region 50 corresponding to the shutter button 28 and the upper nearby region 42 overlap with each other. Since the shutter button 28 is disposed in such a manner, a force that acts on the housing 12 from the rear surface 12B side in a case where the shutter button 28 is pressed can be received from the front surface 12A side by the index finger F1 that abuts the upper nearby region 42. Accordingly, it is possible to reduce a rotational moment that is generated at the housing 12 due to a force acting on the housing 12 as a pressing operation is performed.

Figure 13:
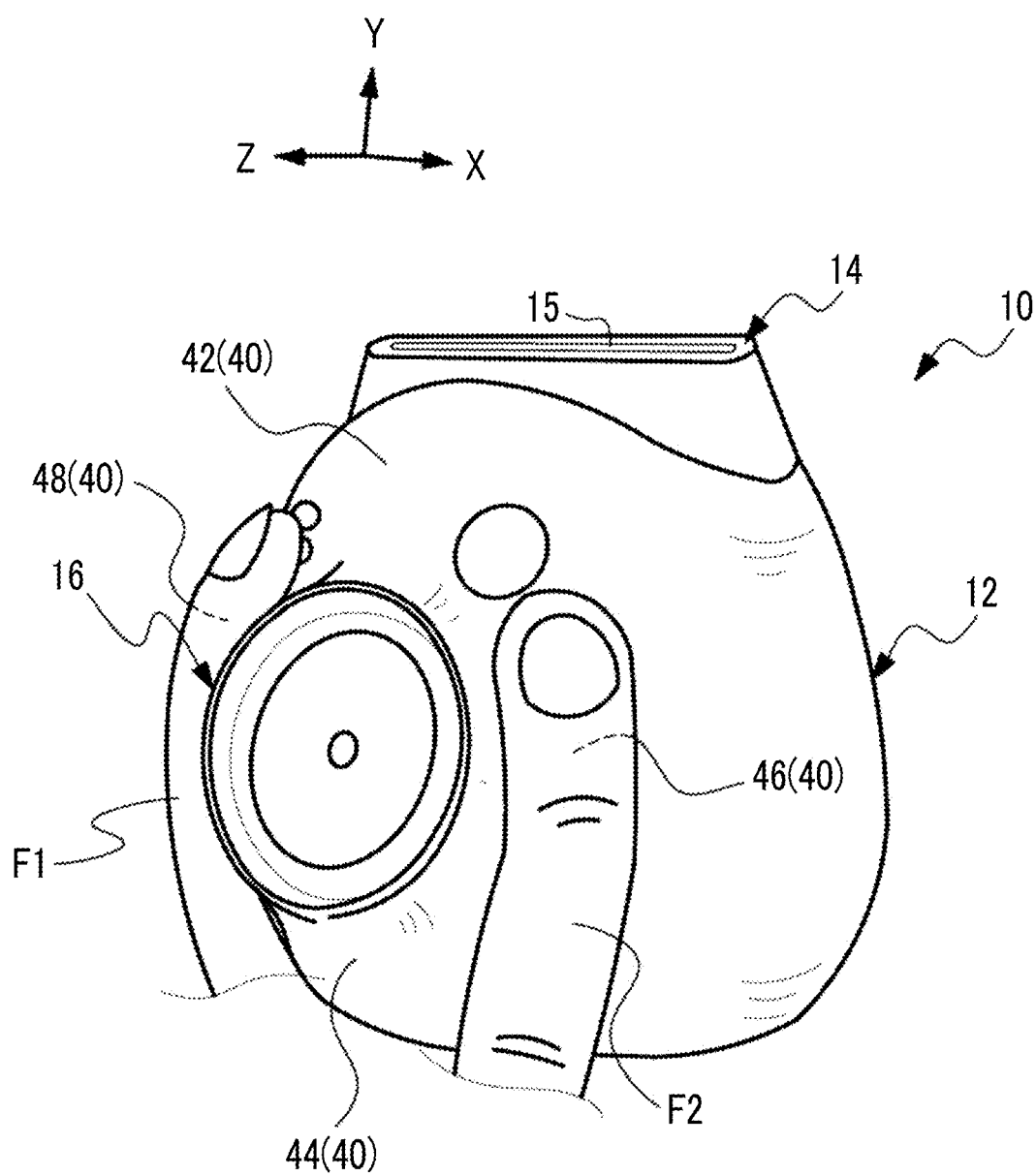
FIG. 13 is an external perspective view showing an example of the way in which the camera according to the embodiment is used.

In addition, in an example shown in FIG. 13, the middle finger F2 is caused to abut the right nearby region 46, and the index finger F1 is caused to abut the left nearby region 48. At the front surface 12A of the housing 12, the index finger F1 and the middle finger F2 sandwich the opening portion 16. Meanwhile, at the rear surface 12B, the user causes the thumb F3 to abut the shutter button 28. As described above, the nearby regions 40 functions regions via which a user can hold the housing 12.

Note that although the description has been made herein by using an example in which the housing 12 is held by the index finger F1 and the middle finger F2 from the front surface 12A side, this is merely an example. For example, the housing 12 may be held by the middle finger F2 and a ring finger from the front surface 12A side. In addition, not only the three fingers but also other fingers may be additionally used.

In other words, the present disclosed technology provides a method of holding the camera 10 in which the index finger F1 corresponds to the upper nearby region 42, the middle finger F2 corresponds to the lower nearby region 44, and the thumb F3 corresponds to the shutter button 28 or a method of holding the camera 10 in which the middle finger F2 corresponds to the upper nearby region 42, the ring finger corresponds to the lower nearby region 44, and the thumb F3 corresponds to the shutter button 28.

Figure 14:
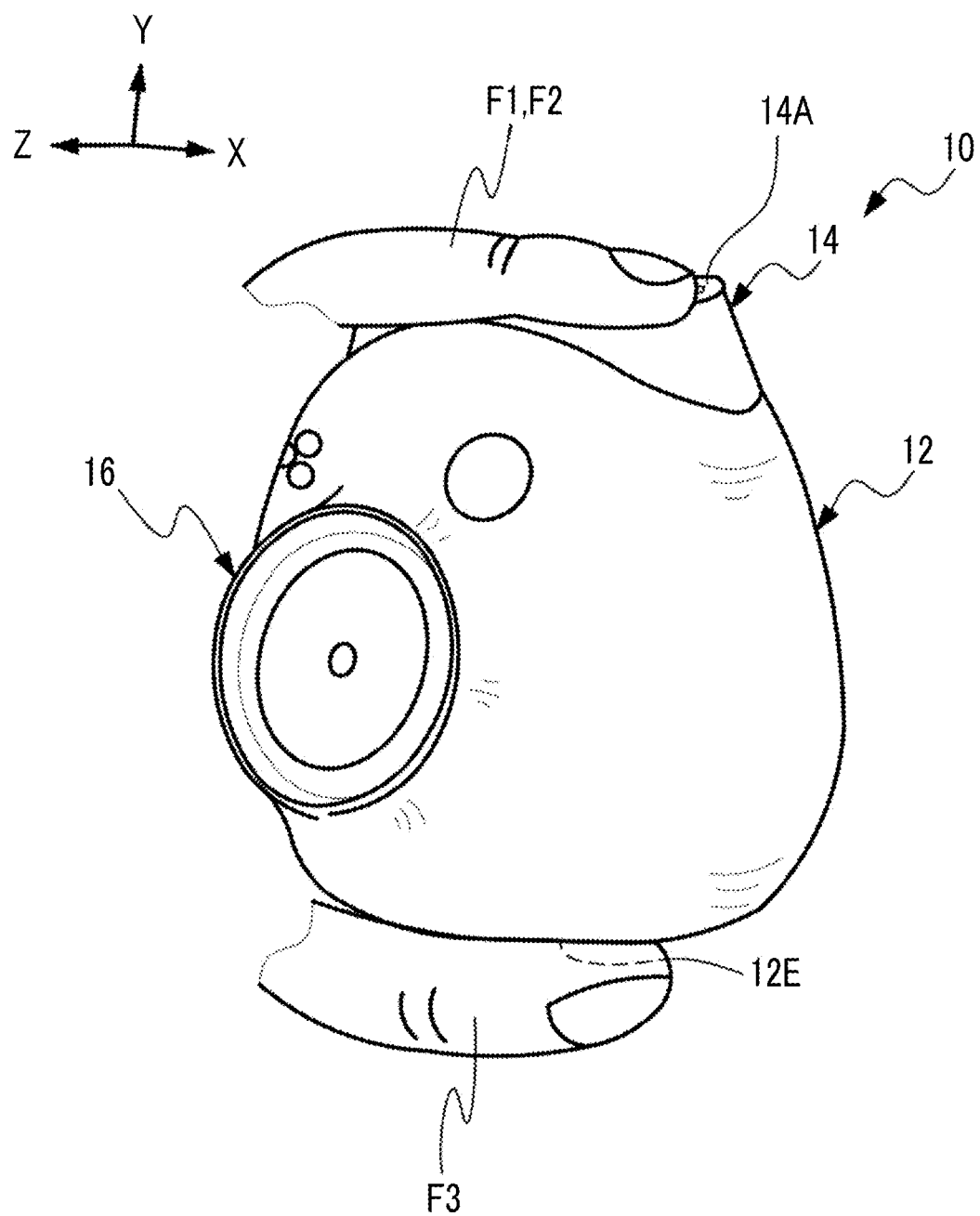
FIG. 14 is an external perspective view showing an example of the way in which the camera according to the embodiment is used.

In addition, in an example shown in FIG. 14, a user grips the camera 10 by pinching the housing 12 with fingers from above and below. Specifically, the index finger F1 is caused to abut the upper surface 14A side of the housing 12, and the thumb F3 is caused to abut the lower surface 12E side of the housing 12. Meanwhile, at the rear surface 12B, the user causes the middle finger F2 to abut the shutter button 28. In this case, the upper surface 14A and the lower surface 12E function as regions via which the user can hold the housing 12. Such a holding method is suitable for the case of self-imaging.

Note that although the description has been made herein by using an example in which the housing 12 is held by the index finger F1 and the thumb F3 in a vertical direction, this is merely an example. For example, the middle finger F2 may be caused to abut the upper surface 14A side of the housing 12, and the thumb F3 may be caused to abut the lower surface 12E side. In addition, the housing 12 may be held in an inverted state.

In other words, the present disclosed technology provides a method of holding the camera 10 in which the thumb F3 corresponds to the lower surface 12E of the housing 12, the middle finger F2 or the ring finger corresponds to the upper surface 14A of the housing 12, and the index finger F1 corresponds to the shutter button 28 or a method of holding the camera 10 in which the index finger F1 corresponds to the upper surface 14A of the housing 12, the thumb F3 corresponds to the lower surface 12E, and the middle finger F2 corresponds to the shutter button 28.

Note that, although the description has been made by using an example in which the camera 10 is operated by means of one hand as an example of the way in which the camera 10 is used, the present disclosed technology is not limited thereto. It is a matter of course that the camera 10 may be held or operated by means of both hands of the user.

As described above, in the camera 10 according to the present embodiment, the opening portion 16 that is disposed at a position at which the opening portion 16 overlaps with the center P1 of the housing 12 in the width direction and the shutter button 28 that is disposed at a position at which the shutter button 28 overlaps with a projection of the opening portion 16 (that is, the projection region 16A) onto the rear surface 12B are provided. Accordingly, for example, in comparison with a case where the opening portion 16 and the shutter button 28 are provided at end portions of the housing 12, it is possible to suppress generation of a rotational moment that acts on the housing 12 due to an operation of pressing the shutter button and to realize stable operation of the camera 10. For example, even in a case where the camera is reduced in size to such a degree that the camera fits in the palm of a hand, the camera can be stably operated.

For example, a housing horizontally long (that is, the horizontal width of the housing is larger than the height of the housing) as in the case of a general digital camera will be considered. A case where the opening portion 16 is provided at an end portion of the housing in the width direction and the shutter button 28 is also provided at the end portion of the housing in the width direction in such a case will be considered. In a case where the shutter button 28 is pressed in such a case, a rotational moment may be generated with respect to the housing 12 due to a force that acts in a case where the shutter button 28 is pressed with respect to the centroid of the housing. Therefore, the housing may be inclined or moved during imaging, and thus an image obtained through the imaging may be blurred. In the present configuration, the opening portion 16 is disposed at a position at which the opening portion 16 overlaps with the center P1 of the housing 12 in the width direction. Furthermore, the shutter button 28 is also disposed at a position on the rear surface 12B at which the shutter button 28 overlaps with the projection region 16A. Accordingly, even in a case where the shutter button 28 is pressed at the time of imaging, a rotational moment caused by a force acting on the housing 12 is small. Therefore, stable operation of the camera 10 is realized.

In addition, in the camera 10 according to the present embodiment, the opening portion 16 is disposed at a position at which the opening portion 16 overlaps with the center P2 of the housing 12 in the height direction. Accordingly, since the opening portion 16 and the shutter button 28 are disposed at positions close to the center of the front surface 12A of the housing 12 even in the height direction of the housing 12, more stable operation is realized.

In addition, in the camera 10 according to the present embodiment, the nearby regions 40 are provided around the opening portion 16, on the front surface 12A. In addition, any of the dimension w2 of the right nearby region 46 or the dimension w3 of the left nearby region 48 is smaller than the total width w1 of the opening portion 16. Alternatively, any of the dimension h2 of the upper nearby region 42 or the dimension h3 of the lower nearby region 44 is smaller than the total height h1 of the opening portion 16.

As described above, the dimensions of the nearby regions 40 are smaller than the size of the opening portion 16. In a case where imaging is to be performed by means of the camera 10, the opening portion 16 through which subject light is incident is not to be covered with a finger. Therefore, a user holds the nearby regions 40 provided around the opening portion 16 with fingers. However, in a case where the nearby regions 40 are narrow, it is difficult to stably operate the camera 10. In the present configuration, as described above, the opening portion 16 that is disposed at a position at which the opening portion 16 overlaps with the center of the housing 12 and the shutter button 28 that is disposed at a position at which the shutter button 28 overlaps with the projection region 16A are provided. Accordingly, stable operation of the camera 10 is realized even in a case where the nearby regions 40 of the camera 10 are narrow.

In addition, in the camera 10 according to the present embodiment, both the dimension w2 of the right nearby region 46 and the dimension w3 of the left nearby region 48 are smaller than the total width w1 of the opening portion 16. Alternatively, both the dimension h2 of the upper nearby region 42 and the dimension h3 of the lower nearby region 44 are smaller than the total height h1 of the opening portion 16. As described above, even in the case of the housing 12 including the nearby regions 40 that are narrow, since the opening portion 16 that is disposed at a position at which the opening portion 16 overlaps with the center of the housing 12 and the shutter button 28 that is disposed at a position at which the shutter button 28 overlaps with the projection region 16A are provided in the present configuration, stable operation of the camera 10 is realized. In addition, for example, the opening portion 16 is disposed in the vicinity of the center of the housing 12 in the width direction or the height direction as seen from the front side, which contributes to improvement in designability of the camera 10.

In addition, in the camera 10 according to the present embodiment, both the dimension w2 of the right nearby region 46 and the dimension w3 of the left nearby region 48 are smaller than the total width w1 of the opening portion 16, and both the dimension h2 of the upper nearby region 42 and the dimension h3 of the lower nearby region 44 are smaller than the total height h1 of the opening portion 16. As described above, even in the case of the housing 12 including the nearby regions 40 that are narrow, since the opening portion 16 that is disposed at a position at which the opening portion 16 overlaps with the center of the housing 12 and the shutter button 28 that is disposed at a position at which the shutter button 28 overlaps with the projection region 16A are provided in the present configuration, stable operation of the camera 10 is realized. In addition, for example, the opening portion 16 is disposed in the vicinity of the center of the housing 12 in the width direction and the height direction as seen from the front side, which contributes to improvement in designability of the camera 10.

In addition, in the camera 10 according to the present embodiment, the nearby regions 40 are provided on at least a portion of the vicinity of the opening portion 16 on the front surface 12A, and the upper nearby region 42, which is one of the nearby regions 40, overlaps with the corresponding region 50 of the shutter button 28 in the height direction. Accordingly, in a case where the shutter button 28 is pressed in a direction from the rear surface 12B side, the housing 12 can be held in a direction from the front surface 12A side that is opposite to a direction in which the shutter button 28 is pressed. Therefore, stable operation can be performed. In other words, a rotational moment that acts on the housing 12 in a case where the shutter button 28 is pressed is suppressed and thus stable operation is realized.

In addition, in the camera 10 according to the present embodiment, the nearby regions 40 are provided on both sides of the front surface 12A of the housing 12 in the height direction or the width direction such that the nearby regions 40 are provided around the opening portion 16. For example, the upper nearby region 42 and the lower nearby region 44 are provided around the opening portion 16. The upper nearby region 42 and the lower nearby region 44 function as regions via which the housing 12 can be held by means of the index finger F1 and the middle finger F2, respectively. In addition, the housing 12 can be held by placing the thumb F3 on the shutter button 28 on the rear surface 12B. Accordingly, it is possible to hold the housing 12 at three points in total since the housing 12 is held at two points on the front surface 12A side and the housing 12 is held at one point on the rear surface 12B side. As a result, stable operation of the camera 10 is realized.

In addition, in the camera 10 according to the present embodiment, the peripheral edge of the opening portion 16 protrudes from the front surface 12A of the housing 12. Since the peripheral edge of the opening portion 16 protrudes from the front surface 12A, it is possible to suppress a finger from being hooked on the imaging lens 20 provided at the opening portion 16. In addition, since the opening portion 16 protrudes from the front surface 12A, it is easy for a user to grasp the position of the opening portion 16.

In addition, in the camera 10 according to the present embodiment, the protrusion amount t1 of a lower side of the peripheral edge of the opening portion 16 is larger than the protrusion amount t2 of an upper side of the peripheral edge of the opening portion 16 as seen in the side view of the housing 12. Accordingly, a protruding portion of the opening portion 16 is easily supported from below and thus stable operation of the camera 10 is realized.

In addition, in the camera 10 according to the present embodiment, as seen in the front view of the housing 12, the projection area S2 of the opening portion 16 is equal to or greater than 20% of the projection area SI of the housing 12. In a case where the proportion of the area of the opening portion 16 to the area of the housing 12 is large, the number of regions that can be used to hold the housing 12 is small. Therefore, in the case of the camera 10 in which the proportion of the area of the opening portion 16 is large as seen in a front view, it is difficult for a user to stably operate the camera 10. In the present configuration, as described above, the opening portion 16 that is disposed at a position at which the opening portion 16 overlaps with the center of the housing 12 and the shutter button 28 that is disposed at a position at which the shutter button 28 overlaps with the projection region 16A are provided. Accordingly, stable operation of the camera 10 is realized even in the case of the camera 10 in which the proportion of the area of the opening portion 16 is large.

In addition, in the camera 10 according to the present embodiment, as seen in the front view of the housing 12, a ratio of the maximum height H to the maximum width W of the housing 12 is 1.0 to 1.2. In the case of the housing 12 having such a size, the number of regions that can be used to hold the housing 12 is small in comparison with a housing of a general digital camera that is horizontally or vertically long. Therefore, in the case of the camera 10 in which the ratio of the maximum height H to the maximum width W of the housing 12 is 1.0 to 1.2, it is difficult for a user to stably operate the camera 10. In the present configuration, as described above, the opening portion 16 that is disposed at a position at which the opening portion 16 overlaps with the center of the housing 12 and the shutter button 28 that is disposed at a position at which the shutter button 28 overlaps with the projection region 16A are provided. Therefore, even in the case of the camera 10 in which the ratio of the maximum height H to the maximum width W of the housing 12 is 1.0 to 1.2, stable operation of the camera 10 is realized.

In addition, in the camera 10 according to the present embodiment, the finger hooking portion 28A on which a user hooks a finger is formed at the shutter button 28. Accordingly, it is easy for the user to grasp the position of the shutter button 28 or to press the shutter button 28. Particularly, in a case where the camera 10 has such a size that the camera 10 fits in the palm of a user's hand, it may be difficult to visually grasp the position of the shutter button 28 because the camera 10 is in the palm of the user's hand. Even in such a case, the position of the shutter button 28 can be checked with a finger and thus the user can easily operate the shutter button 28.

In addition, in the camera 10 according to the present embodiment, the finger hooking portion 28A is the recess portion 28A1 recessed toward the front surface 12A side. Accordingly, since the shutter button 28 is recessed toward an inner side of the housing 12, it is easy to hook a finger on the shutter button 28.

In addition, in the camera 10 according to the present embodiment, the shutter button 28 is pressable in a direction from the rear surface 12B side to the front surface 12A side. In a case where the shutter button 28 is pressed toward the front surface 12A of the housing 12, a rotational moment may act on the housing 12. In the present configuration, as described above, the opening portion 16 that is disposed at a position at which the opening portion 16 overlaps with the center of the housing 12 and the shutter button 28 that is disposed at a position at which the shutter button 28 overlaps with the projection region 16A are provided. Accordingly, generation of a rotational moment acting on the housing 12 is suppressed and stable operation is realized.

In addition, in the camera 10 according to the present embodiment, the housing 12 fits in the sphere B having a radius equal to or greater than 1 cm and equal to or smaller than 10 cm. In the case of the camera 10 having a small size of which the housing 12 fits in the sphere B having a radius equal to or greater than 1 cm and equal to or smaller than 10 cm, the number of regions that can be used by a user to hold the housing is small. In the present configuration, as described above, the opening portion 16 that is disposed at a position at which the opening portion 16 overlaps with the center of the housing 12 and the shutter button 28 that is disposed at a position at which the shutter button 28 overlaps with the projection region 16A are provided. Accordingly, stable operation of the camera 10 is realized even in the case of the camera 10 of which the housing 12 fits in the sphere B having a radius equal to or greater than 1 cm and equal to or smaller than 10 cm.

In addition, in the camera 10 according to the present embodiment, the housing 12 fits in the sphere B having a radius equal to or greater than 1 cm and equal to or smaller than 3 cm. In the case of the camera 10 having a small size of which the housing 12 fits in the sphere B having a radius equal to or greater than 1 cm and equal to or smaller than 3 cm, the number of regions that can be used by a user to hold the housing is small. In the present configuration, as described above, the opening portion 16 that is disposed at a position at which the opening portion 16 overlaps with the center of the housing 12 and the shutter button 28 that is disposed at a position at which the shutter button 28 overlaps with the projection region 16A are provided. Accordingly, stable operation of the camera 10 is realized even in the case of the camera 10 of which the housing 12 fits in the sphere B having a radius equal to or greater than 1 cm and equal to or smaller than 3 cm.

In addition, in the camera 10 according to the present embodiment, a display unit used to check a subject image is not provided. Accordingly, the camera 10 is reduced in size by an amount corresponding to the display unit not provided. Meanwhile, since the display unit is not provided, it is not possible to check a subject image by using the camera alone. Even in such a case, since the operation of the camera 10 is stable, a captured image with less blur can be easily obtained, and thus it is not necessary to repeat imaging for the sake of caution.

In addition, in the camera 10 according to the present embodiment, the front surface 12A, the rear surface 12B, the right surface 12C, and the left surface 12D of the housing 12 are composed of outwardly protruding curved surfaces except for the opening portion 16 and the shutter button 28, the right surface 12C and the left surface 12D connecting the front surface 12A and the rear surface 12B to each other. Accordingly, in a case where a user holds the housing 12 in a wrapping manner, the housing 12 easily fits in the palm of a hand in comparison with a case where the housing 12 is composed of flat surfaces. Therefore, it is easy for the user to hold the housing 12.

In addition, in the camera 10 according to the present embodiment, the lower surface 12E is composed of a flat surface at the outer peripheral surfaces of the housing 12. Accordingly, the camera 10 can be placed. The camera 10 can be placed as described above, which is useful in a case where the camera 10 is used as a fixed-point camera or in a case where self-imaging is to be performed, for example.

Note that in the above-described embodiment, the description has been made by using an example in which the shutter button 28 is disposed at a position at which the shutter button 28 overlaps with the upper nearby region 42 in the height direction as seen in the side view of the housing 12. However, the present disclosed technology is not limited thereto. For example, the corresponding region 50 of the shutter button 28 may overlap with the lower nearby region 44 as seen in the side view of the housing 12. In addition, the corresponding region 50 of the shutter button 28 may overlap with the right nearby region 46 or the left nearby region 48 as seen in the top view of the housing 12.

Modification Example

In addition, in the above-described embodiment, the description has been made by using an example in which the shutter button 28 is disposed at a position at which the shutter button 28 overlaps with the upper nearby region 42 in the height direction as seen in the side view of the housing 12 has been described. However, the present disclosed technology is not limited thereto. In the present modification example, the upper nearby region 42 and the lower nearby region 44 are provided in the height direction of the housing 12. In addition, the upper nearby region 42 and the lower nearby region 44 overlap with a corresponding region 52 of a shutter button 54.

Figure 15:
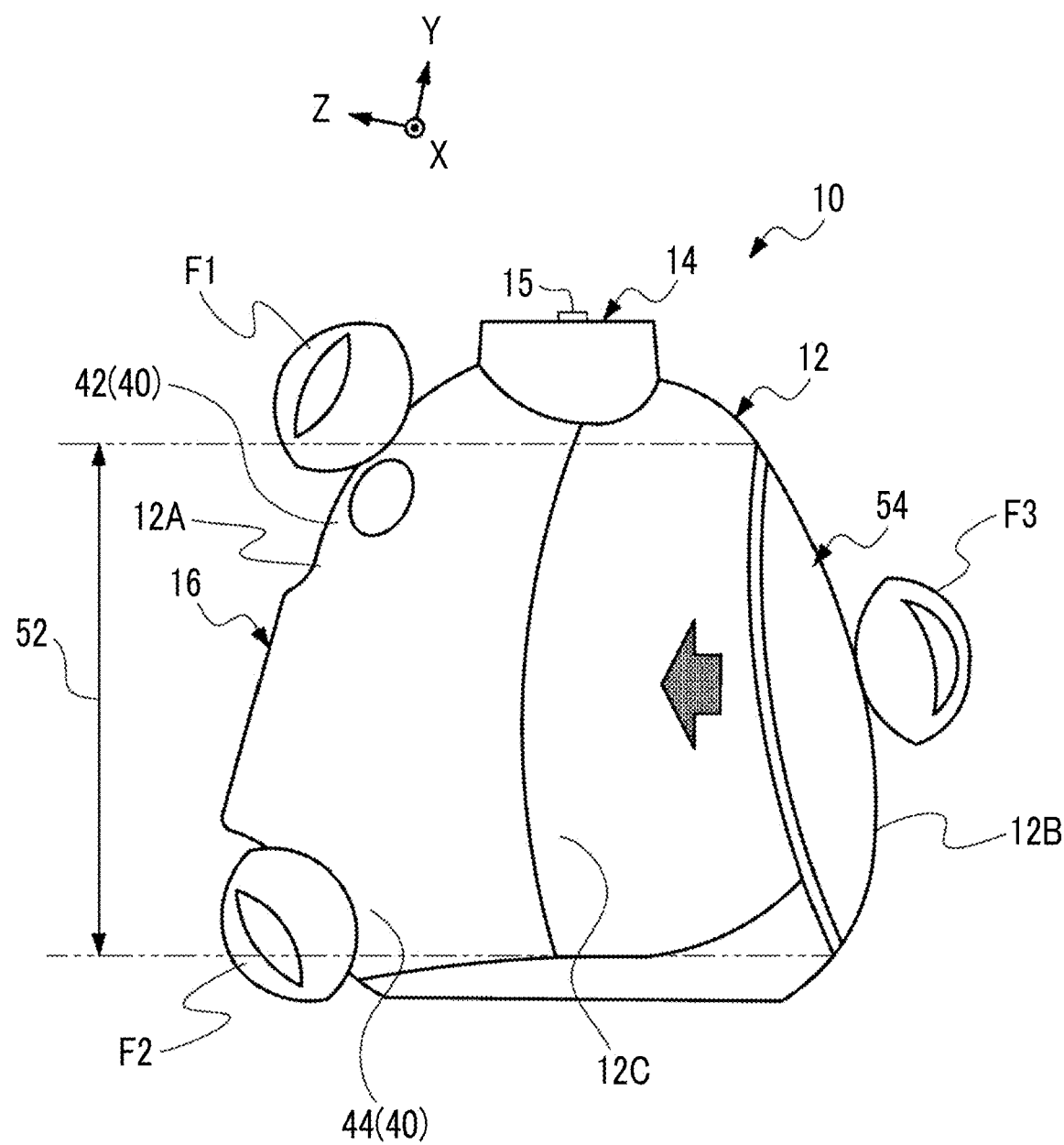
FIG. 15 is a side view showing an example of the configuration of the camera according to the embodiment.

For example, as shown in FIG. 15, the nearby regions 40 are provided on both sides of the opening portion 16 in the height direction. That is, in the height direction, the upper nearby region 42 and the lower nearby region 44 are provided around the opening portion 16. In addition, the rear surface 12B of the housing 12 is provided with the shutter button 54. In addition, as seen in a side view of the housing 12, the shutter button 54 is disposed at a position at which the shutter button 54 overlaps with the upper nearby region 42 and the lower nearby region 44 in the height direction. That is, as seen in the side view of the housing 12, the corresponding region 52 corresponding to the shutter button 54 and the upper nearby region 42 overlap with each other. In addition, as seen in the side view of the housing 12, the corresponding region 52 corresponding to the shutter button 54 and the lower nearby region 44 overlap with each other.

Since the shutter button 54 is disposed in such a manner, a force that acts on the housing 12 from the rear surface 12B side in a case where the shutter button 54 is pressed can be received from the front surface 12A side by the index finger F1 that abuts the upper nearby region 42. Furthermore, the force that acts on the housing 12 from the rear surface 12B side in a case where the shutter button 54 is pressed can be received from the front surface 12A side by the middle finger F2 that abuts the lower nearby region 44. Accordingly, it is possible to reduce a rotational moment that is generated at the housing 12 due to a force acting on the housing 12 as a pressing operation is performed.

As described above, in the camera 10 according to the present modification example, the upper nearby region 42 and the lower nearby region 44 around the opening portion 16 on the front surface 12A overlap with the corresponding region 52 of the shutter button 54 in the height direction. Accordingly, in a case where the shutter button 54 is pressed in a direction from the rear surface 12B side, the housing 12 can be held in a direction from the front surface 12A side that is opposite to a direction in which the shutter button 54 is pressed. Therefore, stable operation can be performed. In other words, a rotational moment that acts on the housing 12 in a case where the shutter button 28 is pressed is suppressed and thus stable operation is realized.

In addition, in the above-described modification example, the description has been made by using an example in which the shutter button 54 is disposed at a position at which the shutter button 54 overlaps with the upper nearby region 42 and the lower nearby region 44 in the height direction as seen in the side view of the housing 12. However, the present disclosed technology is not limited thereto. For example, as seen in the top view of the housing 12, the shutter button 54 may be disposed at a position at which the shutter button 54 overlaps with the right nearby region 46 and the left nearby region 48 in the width direction.

In the above-described embodiment, the description has been made by using an example in which the housing 12 has an approximately egg-like rounded shape. However, the present disclosed technology is not limited thereto. The shape of the housing 12 may be a spherical shape, a spindle shape, or a quadrangular shape.

In addition, in the above-described embodiment, the description has been made by using an example in which the upper nearby region 42, the lower nearby region 44, the right nearby region 46, and the left nearby region 48 are provided around the opening portion 16 of the housing 12. However, the present disclosed technology is not limited thereto. The nearby regions 40 may be any one, two, or three of the upper nearby region 42, the lower nearby region 44, the right nearby region 46, or the left nearby region 48.

In addition, in the above-described embodiment, the description has been made by using an example in which the upper portion of the housing 12 of the camera 10 is provided with the indicator 14. However, the present disclosed technology is not limited thereto. The shape of the indicator 14 is not particularly limited, and the indicator 14 may not be provided.

In addition, in the above-described embodiment, the description has been made by using a case where the shutter button 28 is a physical button as an example. However, the present disclosed technology is not limited thereto. For example, the shutter button 28 may be displayed on a touch panel display.

Contents described and illustrated above are for detailed description of a part according to the present disclosed technology and are merely an example of the present disclosed technology. For example, description of the above-described configurations, functions, actions, and effects is description related to an example of configurations, functions, actions, and effects of parts related to the present disclosed technology. Therefore, it is a matter of course that an unnecessary part of the contents described and illustrated above may be deleted, a new element may be added, and replacement may be made without departing from the spirit of the present disclosed technology. In addition, in order to avoid complication and facilitate the understanding of a portion according to the present disclosed technology, regarding the contents described and illustrated above, description related to common technical knowledge or the like which does not need to be described to enable implementation of the present disclosed technology has been omitted.

In the present specification, "A and/or B" has the same meaning as "at least one of A or B". That is, "A and/or B" means "A, B, or a combination of A and B". In addition, in the present specification, the same concept as in the case of "A and/or B" applies to a case where three or more matters are expressed together by "and/or".

All publications, patent applications, and technical standards described in the present specification are incorporated herein by reference to the same extent as if each publication, patent application, or technical standard was specifically and individually indicated to be incorporated by reference.

Regarding the above-described embodiment, the following supplementary notes will be further disclosed.

Supplementary Note 1

A camera including:

a housing;

an opening portion that is provided in the housing, through which subject light is incident on an imaging lens, and that is disposed at a position at which the opening portion overlaps with a center of the housing in a width direction; and a shutter button that is provided at a rear surface and that is disposed at a position at which the shutter button at least partially overlaps with a projection of the opening portion on the rear surface in a case where a side of the housing on which the opening portion is provided is referred to as a front surface and a side facing the front surface in an optical axis direction of the imaging lens is referred to as the rear surface.

Supplementary Note 2

The camera according to Supplementary Note 1, in which the opening portion is disposed at a position at which the opening portion overlaps with a center of the housing in a height direction, the height direction being orthogonal to the width direction.

Supplementary Note 3

The camera according to Supplementary Note 1 or 2, in which a nearby region is provided on at least a portion of a vicinity of the opening portion on the front surface, and a dimension of the nearby region in the width direction of the housing is smaller than a total width of the opening portion or a dimension of the nearby region in a height direction of the housing that is orthogonal to the width direction is smaller than a total height of the opening portion.

Supplementary Note 4

The camera according to Supplementary Note 3, in which a dimension of the nearby region is smaller than the total width of the opening portion on both sides of the opening portion in the width direction or a dimension of the nearby region is smaller than the total height of the opening portion on both sides of the opening portion in the height direction.

Supplementary Note 5

The camera according to Supplementary Note 4, in which the dimension of the nearby region is smaller than the total width of the opening portion on both sides of the opening portion in the width direction, and the dimension of the nearby region is smaller than the total height of the opening portion on both sides of the opening portion in the height direction.

Supplementary Note 6

The camera according to any one of Supplementary Notes 1 to 5, in which a nearby region is provided on at least a portion of a vicinity of the opening portion on the front surface, and a portion of the nearby region overlaps with the shutter button in a direction orthogonal to an optical axis.

Supplementary Note 7

The camera according to Supplementary Note 6, in which the nearby region is provided on each of both sides of the opening portion in the width direction or a height direction of the housing.

Supplementary Note 8

The camera according to any one of Supplementary Notes 1 to 7, in which a nearby region, via which the housing is holdable with fingers, is provided on each of both sides of the opening portion in the width direction or a height direction of the housing.

Supplementary Note 9

The camera according to any one of Supplementary Notes 1 to 8, in which a peripheral edge of the opening portion protrudes on the front surface.

Supplementary Note 10

The camera according to any one of Supplementary Notes 1 to 9, in which, as seen in a side view of the housing, a protrusion amount of a peripheral edge of the opening portion is larger on a lower side than on an upper side in a height direction of the housing in a case where a surface of the housing that connects the front surface and the rear surface to each other is referred to as a side surface.

Supplementary Note 11

The camera according to any one of Supplementary Notes 1 to 10, in which, as seen in a front view of the housing, a projection area of the opening portion is equal to or greater than 20% of a projection area of the housing.

Supplementary Note 12

The camera according to any one of Supplementary Notes 1 to 11, in which, as seen in a front view of the housing, a ratio of a maximum height of the housing to a maximum width of the housing is 1.0 to 1.2.

Supplementary Note 13

The camera according to any one of Supplementary Notes 1 to 12, in which a finger hooking portion is formed at the shutter button.

Supplementary Note 14

The camera according to Supplementary Note 13, in which the finger hooking portion is a recess portion recessed toward a front surface side.

Supplementary Note 15

The camera according to any one of Supplementary Notes 1 to 14, in which the shutter button is pressable in a direction from a rear surface side to a front surface side.

Supplementary Note 16

The camera according to any one of Supplementary Notes 1 to 15, in which the housing fits in a sphere having a radius equal to or greater than 1 cm and equal to or smaller than 10 cm.

Supplementary Note 17

The camera according to any one of Supplementary Notes 1 to 16, in which the housing fits in a sphere having a radius equal to or greater than 1 cm and equal to or smaller than 3 cm.

Supplementary Note 18

The camera according to any one of Supplementary Notes 1 to 17, in which the housing is not provided with a display unit used to check a subject image.

Supplementary Note 19

The camera according to any one of Supplementary Notes 1 to 18, in which the front surface, the rear surface, and both side surfaces of the housing are composed of curved surfaces that protrude outward except for the opening portion and the shutter button, the side surfaces connecting the front surface and the rear surface to each other.

Supplementary Note 20

The camera according to any one of Supplementary Notes 1 to 19, in which at least a portion of a region including a center of a lower surface of an outer peripheral surface of the housing is composed of a flat surface.

What is claimed is:

1. A camera comprising:

a housing;

an opening portion that is provided in the housing, through which subject light is incident on an imaging lens, and that is disposed at a position at which the opening portion overlaps with a center of the housing in a width direction; and a shutter button that is provided at a rear surface and that is disposed at a position at which the shutter button at least partially overlaps with a projection of the opening portion on the rear surface in a case where a side of the housing on which the opening portion is provided is referred to as a front surface and a side facing the front surface in an optical axis direction of the imaging lens is referred to as the rear surface, wherein:

a nearby region is provided on at least a portion of a vicinity of the opening portion on the front surface, and the nearby region at least partially overlaps with a projection of the shutter button on the front surface.

2. The camera according to claim 1,
wherein the opening portion is disposed at a position at which the opening portion overlaps with a center of the housing in a height direction, the height direction being orthogonal to the width direction.

3. The camera according to claim 1,
wherein a dimension of the nearby region in the width direction of the housing is smaller than a total width of the opening portion or a dimension of the nearby region in a height direction of the housing that is orthogonal to the width direction is smaller than a total height of the opening portion.

4. The camera according to claim 3,
wherein the dimension of the nearby region is smaller than the total width of the opening portion on both sides of the opening portion in the width direction or a dimension of the nearby region is smaller than the total height of the opening portion on both sides of the opening portion in the height direction.

5. The camera according to claim 4,
wherein the dimension of the nearby region is smaller than the total width of the opening portion on both sides of the opening portion in the width direction, and the dimension of the nearby region is smaller than the total height of the opening portion on both sides of the opening portion in the height direction.

6. The camera according to claim 1,
wherein the nearby region is provided on each of both sides of the opening portion in the width direction or a height direction of the housing.

7. The camera according to claim 1,
wherein the nearby region, via which the housing is holdable with fingers, is provided on each of both sides of the opening portion in the width direction or a height direction of the housing.

8. The camera according to claim 1,
wherein a peripheral edge of the opening portion protrudes on the front surface.

9. The camera according to claim 1,
wherein, as seen in a side view of the housing, a protrusion amount of a peripheral edge of the opening portion is larger on a lower side of the opening portion than on an upper side of the opening portion in a height direction of the housing in a case where a surface of the housing that connects the front surface and the rear surface to each other is referred to as a side surface.

10. The camera according to claim 1,
wherein, as seen in a front view of the housing, a projection area of the opening portion is equal to or greater than 20% of a projection area of the housing.

11. The camera according to claim 1,
wherein, as seen in a front view of the housing, a ratio of a maximum height of the housing to a maximum width of the housing is 1.0 to 1.2.

12. The camera according to claim 1,
wherein a finger hooking portion is formed at the shutter button.

13. The camera according to claim 12,
wherein the finger hooking portion is a recess portion recessed toward a front surface side.

14. The camera according to claim 1,
wherein the shutter button is pressable in a direction from a rear surface side to a front surface side.

15. The camera according to claim 1,
wherein the housing fits in a sphere having a radius equal to or greater than 1 cm and equal to or smaller than 10 cm.

16. The camera according to claim 1,
wherein the housing fits in a sphere having a radius equal to or greater than 1 cm and equal to or smaller than 3 cm.

17. The camera according to claim 1,
wherein the housing is not provided with a display unit used to check a subject image.

18. The camera according to claim 1,
wherein the front surface, the rear surface, and both side surfaces of the housing are composed of curved surfaces that protrude outward except for the opening portion and the shutter button, the side surfaces connecting the front surface and the rear surface to each other.

19. The camera according to claim 1,
wherein at least a portion of a region including a center of a lower surface of an outer peripheral surface of the housing is composed of a flat surface.

* * * * *